(12) United States Patent
Knode et al.

(10) Patent No.: US 12,095,263 B2
(45) Date of Patent: Sep. 17, 2024

(54) COMMUNICATION OF MESSAGES USING A COORDINATED MULTICAST TECHNIQUE

(71) Applicant: Lutron Technology Company LLC, Coopersburg, PA (US)

(72) Inventors: Galen Edgar Knode, Macungie, PA (US); Jordan H. Crafts, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 465 days.

(21) Appl. No.: 17/374,832

(22) Filed: Jul. 13, 2021

(65) Prior Publication Data

US 2022/0014041 A1     Jan. 13, 2022

Related U.S. Application Data

(60) Provisional application No. 63/051,156, filed on Jul. 13, 2020.

(51) Int. Cl.
| | |
|---|---|
| *H04W 72/00* | (2023.01) |
| *H02J 13/00* | (2006.01) |
| *H04W 4/06* | (2009.01) |
| *H04W 72/12* | (2023.01) |
| *H04W 72/20* | (2023.01) |

(52) U.S. Cl.
CPC .. *H02J 13/00026* (2020.01); *H02J 13/00004* (2020.01); *H04W 4/06* (2013.01); *H04W 72/12* (2013.01); *H04W 72/20* (2023.01)

(58) Field of Classification Search
CPC ......... H02J 13/00026; H02J 13/00004; H04W 72/20; H04W 4/06; H04W 72/12
See application file for complete search history.

(56) References Cited

U.S. PATENT DOCUMENTS

| | | | |
|---|---|---|---|
| 7,391,297 B2 | 6/2008 | Cash et al. | |
| 8,009,042 B2 | 8/2011 | Steiner | |
| 8,199,010 B2 | 6/2012 | Sloan et al. | |
| 8,228,184 B2 | 7/2012 | Blakeley et al. | |
| 8,330,638 B2 | 12/2012 | Altonen et al. | |
| 8,410,706 B2 | 4/2013 | Steiner et al. | |

(Continued)

FOREIGN PATENT DOCUMENTS

| | | | |
|---|---|---|---|
| EP | 2306776 A2 | 4/2011 | |
| EP | 2760156 A1 * | 7/2014 | ........... G06F 1/3206 |
| WO | 2014187672 A1 | 11/2014 | |

*Primary Examiner* — Erika A Washington
(74) *Attorney, Agent, or Firm* — Flaster Greenberg, PC

(57) ABSTRACT

A load control system may include multiple devices capable of communicating with one another to enable load control via a network. Devices communicating in the load control system may be powered by a lower power supply (e.g., a battery). These devices may be power-conservative control devices. A device may transmit an indication that it is a power-conservative control device. The device may be assigned a multicast slot. The multicast slot may occur periodically and may be associated with a multicast phase. An indication of the device's assigned multicast slot may be transmitted to other devices in the load control system. Messages may be transmitted to the device from one or more other devices during its configured multicast slot. The device may periodically transition its communication circuit on and off based on the multicast slot.

21 Claims, 13 Drawing Sheets

(56) References Cited

U.S. PATENT DOCUMENTS

| | | |
|---|---|---|
| 8,451,116 B2 | 5/2013 | Steiner et al. |
| 8,950,461 B2 | 2/2015 | Adams et al. |
| 9,488,000 B2 | 11/2016 | Kirby et al. |
| 10,264,651 B2 | 4/2019 | Steiner |
| 2008/0092075 A1 | 4/2008 | Jacob |
| 2012/0286940 A1 | 11/2012 | Carmen, Jr. et al. |
| 2013/0030589 A1 | 1/2013 | Pessina et al. |
| 2014/0265568 A1 | 9/2014 | Crafts et al. |
| 2018/0014387 A1* | 1/2018 | Bard .................. H04L 12/2816 |
| 2018/0167547 A1 | 6/2018 | Casey et al. |
| 2020/0146130 A1 | 5/2020 | Özcan et al. |

* cited by examiner

COMMUNICATION OF MESSAGES USING A COORDINATED MULTICAST TECHNIQUE

CROSS REFERENCE

This application claims priority from U.S. Provisional Patent Application No. 63/051,156, filed Jul. 13, 2020, which is hereby incorporated by reference.

BACKGROUND

A user environment, such as a residence or an office building, for example, may be configured using various types of load control systems. A lighting control system may be used to control the lighting loads providing artificial light in the user environment. A motorized window treatment control system may be used to control the natural light provided to the user environment. An HVAC system may be used to control the temperature in the user environment.

Each load control system may include various control devices, including input devices and load control devices. The control devices may receive messages (e.g., digital messages), which may include load control instructions, for controlling an electrical load from one or more of the input devices. The control devices may be capable of directly controlling an electrical load. The input devices may be capable of indirectly controlling the electrical load via the load control device. Examples of load control devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, glare sensors, color temperature sensors, temperature sensors, and/or the like. Remote control devices may receive user input for performing load control.

Certain control devices may be powered by a finite power source (e.g., a battery). Communicating over RF may consume the finite power source of the load control device. For example, the load control device may enable an RF receiver in order to communicate over RF, which may deplete the finite power source of the load control device. Further, a user of the load control device may continually replace the battery, which may result in a poor user experience. In an effort to extend the life of the finite power source, the load control device may periodically transition the RF receiver between and on state and an off state. The input device (e.g., or another device attempting to communicate over RF) may account for load control device transitions, for example, by transmitted messages to the load control device when the RF receiver is in an on state. As the number of load control device that periodically transition from an on state to an off state increases, however, RF communications may become unreliable (e.g., messages may fail to be received over RF).

An input device may asynchronously control one or more load control devices over RF. For example, the input device may not periodically transmit commands to the one or more load control devices. Rather, the input device may transmit commands in response to user inputs, which may occur unexpectedly or asynchronously. In addition, certain load control device (e.g., load control devices that are battery powered) may be configured to periodically transition their respective RF transceivers on and off. Further, one or more of the battery powered load control devices may be configured to respond to the commands uniformly and promptly (e.g., motorized window shades). However, the one or more load control devices configured to uniformly respond to commands may not be configured to transition their transceivers on uniformly and the commands may not be uniformly received and/or responded to.

SUMMARY

A load control system may include control devices capable of communicating with one another to enable load control. The control devices may include control-source devices and/or control-target devices. Control-source devices may be input devices capable of communicating messages for controlling an electrical load in the load control system. Control-target devices may be load control devices capable of receiving the messages for controlling the electrical load.

Each of the control devices (e.g., including the input devices and/or load control devices described herein) in the load control system may draw on a greater power supply (e.g., a continuous power source, such as an alternating-current (AC) power source) or a lower power supply. Control devices that draw on a lower power supply may be power-conservative control devices. An example of a power-conservative control device may be control devices powered by a finite power source (e.g., a battery). Power-conservative control devices may be connected to an external direct current (DC) supply and may draw lower power from the DC power supply than control devices that may draw on a greater power supply, such as an AC power source. Power-conservative control devices may utilize super capacitors as a power source (e.g., which may have about 5% of the capacity of a battery). The super capacitors may be used to power the control device before the control device recharges the super capacitors. Power-conservative control devices may be powered from alternative energy sources (e.g., solar cells). Power-conservative control devices may minimize power drawn from the alternative energy sources.

The control devices may communicate with one another via a wired and/or wireless network. The network may define roles for each of the control devices in the network. Each role in the network may define the responsibilities of the device assigned the particular role. A control device powered by a continuous power source may be assigned the role of a leader device, a router device, and/or an end device. A power-conservative control device may be defined as a sleepy-end device, as the power-conservative control device may operate between sleep periods to conserve power (e.g., by turning off the communication circuit) and wake periods that may use more power (e.g., by turning on the communication circuit to transmit and/or receive messages). Though embodiments may be described herein as being performed using a sleepy-end device, other types of power-conservative control devices may be similarly implemented in those embodiments.

The control device may transmit an indication of the device type of the control device. For example, a power-conservative control device may transmit an indication that the control device is a power-conservative control device, powered by a finite power source, a sleepy-end device in the network, or provide another similar indication. In response to transmitting the indication that the control device is a power-conservative control device (e.g., a sleepy-end device), the control device may be configured with (e.g., assigned) a multicast slot. The multicast slot may occur periodically and may be associated with a multicast phase. For example, a router device that the device is attached to may transmit the indication of the multicast slot and/or multicast phase. The multicast phase may be the time between the beginning of a communication cycle of a router and the beginning of a multicast slot (e.g., a first multicast slot).

The multicast slot may occur periodically and describe the period of time during which the device expects to receive messages from the router device. For example, the router device may transmit unicast and/or multicast messages during a respective multicast slot. The device may periodically transition its communication circuit on and off based on the multicast slot. For example, the device may transition its communication circuit on during the multicast slot, such that the device may receive messages. Similarly, the device may transition its communication slot off in between respective multicast slots. In addition, consumption of the device's finite power source may be lower when that communication circuit is off as compared to when the communication circuit is on.

As described herein, a router device may receive an indication of a device type from another device. For example, the other device may be a device that is attached to (e.g., a child of) the router device. For example, the other device may be an end device or a sleepy-end device (e.g. an end device that is powered by a finite power source). If the other device is a sleepy-end device, the router device may establish and configure (e.g., transmit an indication of the multicast phase) the other device with a multicast slot. The multicast slot may occur periodically and/or may be associated with a multicast phase. The router device may transmit messages to the sleepy-end device based on the multicast slot. For example, the router device may transmit multicast and/or unicast messages during the multicast slot.

A router device may determine whether the configured multicast slot and/or multicast phase of a certain sleepy-end device overlaps with the multicast slot and/or multicast phase of another sleepy-end device. For example, if the configured multicast slot and/or multicast phase of a certain sleepy-end device overlaps with the multicast slot and/or multicast phase of another sleepy-end device, the likelihood of message transmission failures may increase (e.g. due to message collisions during the multicast slot). If the multicast slot and/or multicast phase of the certain sleepy-end device overlaps with the multicast slot and/or multicast phase of the other sleepy-end device, the router device may determine a multicast phase adjustment for the sleepy-end device, which may decrease the likelihood of message transmission failures. In addition, the router device may transmit an indication of the multicast phase adjustment.

A router device may establish and configure another device with a unicast slot. For example, the other device may expect to receive unicast messages during the established unicast slot. The router device may transmit unicast messages to the device during based on the establish unicast slot. For example, a unicast slot may be established in between successive multicast slots.

DETAILED DESCRIPTION

Figure 1A:
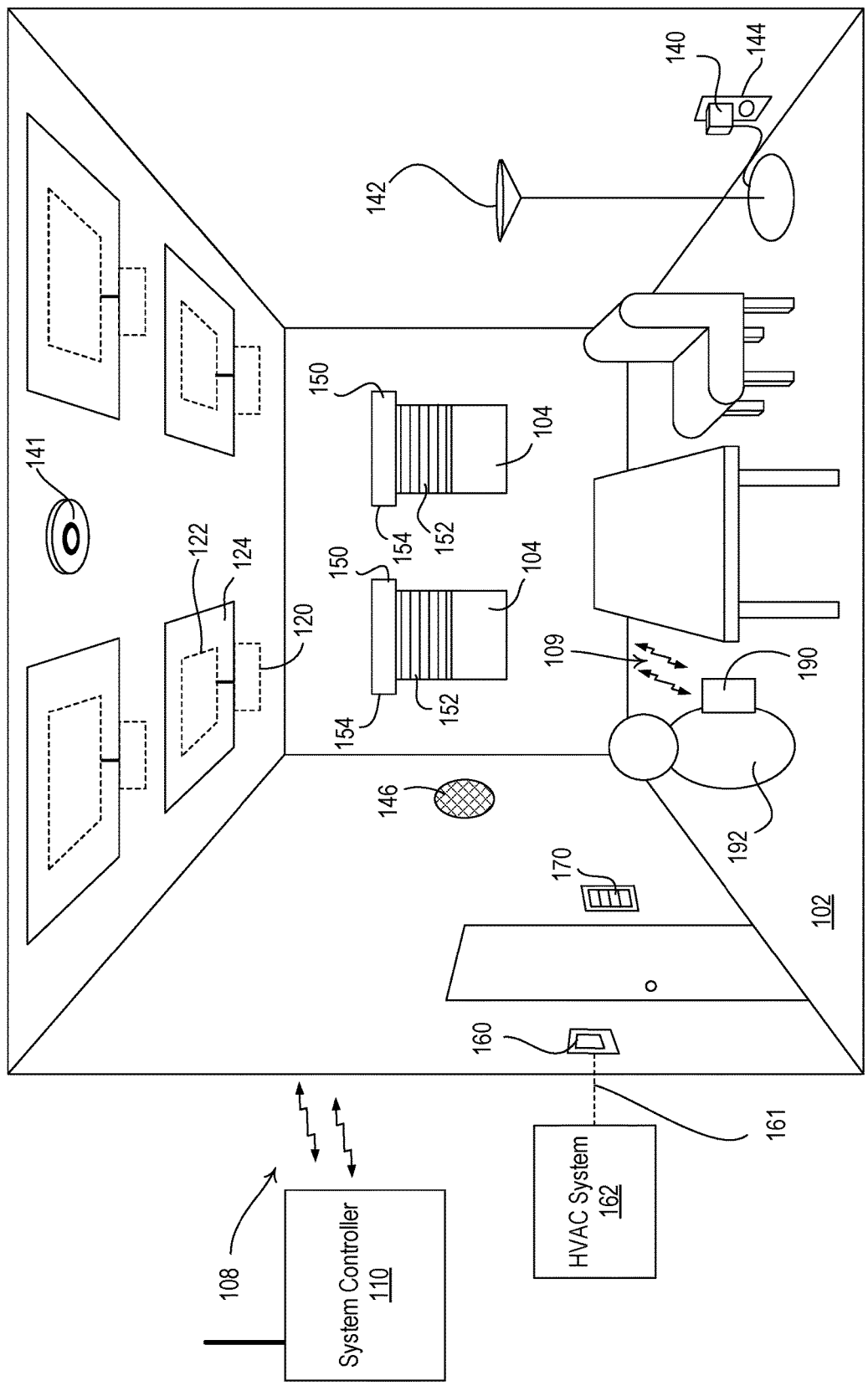
FIG. 1A is a diagram of an example load control system.

FIG. 1A is a diagram of an example load control system 100 for controlling the amount of power delivered from an alternating-current (AC) power source (not shown) to one or more electrical loads. The load control system 100 may be installed in a load control environment 102. The load control environment 102 may include a space in a residential or commercial building. For example, the load control system 100 may be installed in one or more rooms on one or more floors in the building.

The load control system 100 may comprise a plurality of control devices. The control devices may include load control devices that are configured to control one or more electrical loads in the load control environment 102 (also referred to as a user environment). For example, the load control devices may control the one or more electrical loads in response to input from one or more input devices or other devices in the load control system 100.

The load control devices in the load control system 100 may include lighting control devices. For example, the load control system 100 may include lighting control devices 120 for controlling lighting loads 122 in a corresponding lighting fixture 124. The lighting control devices 120 may comprise light-emitting diode (LED) drivers and the lighting loads 122 may comprise LED light sources. While each lighting fixture 124 is shown having a single lighting load 122, each lighting fixture may comprise one or more individual light sources (e.g., lamps and/or LED emitters) that may be controlled individually and/or in unison by the respective lighting control device. Though an LED driver is provided as an example lighting control device, other types of lighting control devices may be implemented as load control devices in the load control system 100. For example, the load control system 100 may comprise dimmer switches, electronic dimming ballasts for controlling fluorescent lamps, or other lighting control devices for controlling corresponding lighting loads. The lighting control device 120 may be configured to directly control an amount of power provided to the lighting load 122. The lighting control device 120 may be configured to receive (e.g., via wired or wireless communications) messages via radio-frequency (RF) signals 108, 109 and to control the lighting load 122 in response to the received messages. One will recognize that lighting control device 120 and lighting load 122 may be integral and thus part of the same fixture or bulb, for example, or may be separate.

The load control devices in the load control system 100 may comprise one or more appliances that are able to receive the RF signals 108 (e.g., wireless signals) for performing load control. In an example, the load control system may include a speaker 146 (e.g., part of an audio/visual or intercom system), which is able to generate audible sounds, such as alarms, music, intercom functionality, etc. in response to RF signals 108.

The load control devices in the load control system 100 may comprise one or more daylight control devices, e.g., motorized window treatments 150, such as motorized cellular shades, for controlling the amount of daylight entering the load control environment 102. Each motorized window treatment 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the load control environment 102. The motor drive units of the motorized window treatments 150 may be configured to receive messages via the RF signals 108 and adjust the position of the respective window treatment fabric 152 in response to the received messages. For example, the motorized window treatments may be battery-powered. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control devices in the load control system 100 may comprise a plug-in load control device 140 for controlling a plug-in electrical load, e.g., a plug-in lighting load (such as a floor lamp 142 or a table lamp) and/or an appliance (such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive messages via the RF signals 108 and to turn on and off or adjust the intensity of the floor lamp 142 in response to the received messages.

The load control devices in the load control system 100 may comprise one or more temperature control devices, e.g., a thermostat 160 for controlling a room temperature in the load control environment 102. The thermostat 160 may be coupled to a heating, ventilation, and air conditioning (HVAC) system 162 via a control link 161 (e.g., an analog control link or a wired digital communication link). The thermostat 160 may be configured to wirelessly communicate messages with a controller of the HVAC system 162. The thermostat 160 may comprise a temperature sensor for measuring the room temperature of the load control environment 102 and may control the HVAC system 162 to adjust the temperature in the room to a setpoint temperature. The load control system 100 may comprise one or more wireless temperature sensors (not shown) located in the load control environment 102 for measuring the room temperatures. The HVAC system 162 may be configured to turn a compressor on and off for cooling the load control environment 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the load control environment 102. The thermostat 160 may be configured to receive messages via the RF signals 108 and adjust heating, ventilation, and cooling in response to the received messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable electrical receptacle, or controllable power strip for controlling one or more plug-in loads; a motor control unit for controlling a motor load, such as a ceiling fan or an exhaust fan; a drive unit for controlling a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller.

The load control system 100 may comprise one or more input devices capable of receiving an input event for controlling one or more load control devices in the load control system 100. The input devices and the load control devices may be collectively referred to as control devices in the load control system 100. The input devices in the load control system 100 may comprise one or more remote control devices, such as a remote control device 170. The remote control device may be battery-powered. The remote control device 170 may be configured to transmit messages via RF signals 108 to one or more other devices in the load control system 100 in response to an input event, such as an actuation of one or more buttons or a rotation of a rotary knob of the remote control device 170. For example, the remote control device 170 may transmit messages to the lighting control device 120, the plug-in load control device 140, the motorized window treatments 150, and/or the temperature control device 160 via the RF signals 108 in response to actuation of one or more buttons located thereon. The remote control device 170 may also communicate with other devices in the load control system 100 via a wired communication link. In response to an input event at the remote control device 170, a devices to which the remote control device 170 is wired may be triggered to transmit messages to one or more other devices in the load control system 100. The remote control device 170 may comprise a keypad. In another example, the remote control device 170 may comprise a rotary knob configured to transmit messages to one or more other devices in response to a rotation on the rotary knob (e.g., rotation of a predefined distance or for a predefined period of time). The remote control device 170 may be mounted to a structure, such as a wall, a toggle actuator of a mechanical switch, or a pedestal to be located on a horizontal surface. In another example, the remote control device 170 may be handheld. The remote control device 170 may provide feedback (e.g., visual feedback) to a user of the remote control device 170 on a visual indicator, such as a status indicator. The status indicator may be illuminated by one or more light emitting diodes (LEDs) for providing feedback. The status indicator may provide different types of feedback. The feedback may include feedback indicating actuations by a user or other user interface event, a status of electrical loads being controlled by the remote control device 170, and/or a status of the load control devices being controlled by the remote control device 170. The feedback may be displayed in response to user interface event and/or in response to messages received that indicate the status of load control devices and/or electrical loads. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING-MULTIPLE MOUNTING MEANS, and U.S. Patent Application Publication No. 2012/0286940, published Nov. 15, 2012, entitled CONTROL DEVICE HAVING A NIGHT-LIGHT, the entire disclosures of Which are hereby incorporated by reference.

The input devices of the load control system 100 may comprise one or more sensor devices, such as a sensor device 141. The sensor device 141 may be configured to transmit messages via the RF signals 108 to one or more other devices in the load control system 100 in response to an input event, such as a sensor measurement event. The sensor device 141 may also or alternatively be configured to transmit messages via a wired communication link to one or more other devices in the load control system 100 in response to an input event, such as a sensor measurement event. The sensor device 141 may operate as an ambient light sensor or a daylight sensor and may be capable of performing a sensor measurement event by measuring a total light intensity in the space around the sensor device 141. The sensor device 141 may transmit messages including the measured light level or control instructions in response to the measured light level via the RF signals 108. Examples of RF load control systems having daylight sensors are described in greater detail in commonly assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY POWERED DAYLIGHT SENSOR, the entire disclosures of which are hereby incorporated by reference.

The sensor device 141 may operate as an occupancy sensor configured to detect occupancy and vacancy conditions in the load control environment 102. The sensor device 141 may be capable of performing the sensor measurement event by measuring an occupancy condition or a vacancy condition in response to occupancy or vacancy, respectively, of the load control environment 102 by the user 192. For example, the sensor device 141 may comprise an infrared (IR) sensor capable of detecting the occupancy condition or the vacancy condition in response to the presence or absence, respectively, of the user 192. The sensor device 141 may transmit messages including the occupancy conditions or vacancy conditions, or control instructions generated in response to the occupancy/vacancy conditions, via the RF signals 108. Again, the sensor device 141 may also or alternatively transmit messages including the occupancy conditions or vacancy conditions, or control instructions generated in response to the occupancy/vacancy conditions via a wired communication link. Examples of load control systems having occupancy and vacancy sensors are described in greater detail in commonly-assigned U.S. Pat. No. 8,228,184, issued Jul. 24, 2012, entitled. BATTERY-POWERED OCCUPANCY SENSOR, U.S. Pat. No. 8,009, 042, issued Aug., 30, 2011 Sep. 3, 2008, entitled RADIO-FREQUENCY LIGHTING CONTROL SYSTEM WITH OCCUPANCY SENSING, and U.S. Pat. No. 8,199,010, issued Jun. 12, 2012, entitled METHOD AND APPARATUS FOR CONFIGURING A WIRELESS SENSOR, the entire disclosures of which are hereby incorporated by reference.

The sensor device 141 may operate as a visible light sensor (e.g., including a camera or other device capable of sensing visible light). The sensor device 141 may be capable of performing the sensor measurement event by measuring an amount of visible light within the load control environment 102. For example, the sensor device 141 may comprise a visible light sensing circuit having an image recording circuit, such as a camera, and an image processing circuit. The image processing circuit may comprise a digital signal processor (DSP), a microprocessor, a programmable logic device (PLD), a microcontroller, an application specific integrated circuit (ASIC), a field-programmable gate array (FPGA), or any suitable processing device capable of processing images or levels of visible light. The sensor device 141 may be positioned towards the load control environment 102 to sense one or more environmental characteristics in the load control environment 102. The image recording circuit of the sensor device 141 may be configured to capture or record an image. The image recording circuit of the sensor device 141 may provide the captured image to the image processor. The image processor may be configured to process the image into one or more sensed signals that are representative of the sensed environmental characteristics. The sensed environmental characteristics may be interpreted from the sensed signals by the control circuit of the sensor device 141 or the sensed signals may be transmitted to one or more other devices via the RF signals 108, 109 (e.g., a computing device in the load control environment) for interpreting the sensed environmental characteristics. For example, the sensed environmental characteristics interpreted from the sensed signals may comprise an occurrence of movement, an amount of movement, a direction of movement, a velocity of movement, a counted number of occupants, an occupancy condition, a vacancy condition, a light intensity, a color of visible light, a color temperature of visible light, an amount of direct sunlight penetration, or another environmental characteristic in the load control environment 102. In another example, the sensor device 141 may provide a raw image or a processed (e.g., preprocessed) image to one or more other devices (e.g., computing devices) in the load control system 100 for further processing. The sensor device 141 may operate as a color temperature sensor when sensing the color temperature of the visible light. Examples of load control systems having visible light sensors are described in greater detail in commonly-assigned U.S. Pat. No. 10,264,651, issued Apr. 16, 2019, entitled LOAD CONTROL SYSTEM HAVING A VISIBLE LIGHT SENSOR, and U.S. Patent App. Pub. No. 2018/0167547, published Jun. 14, 2018, entitled CONFIGURATION OF A VISIBLE LIGHT SENSOR, the entire disclosures of which are hereby incorporated by reference.

The sensor device 141 may be external to the lighting fixtures 124 (e.g., affixed or attached to a ceiling or a wall of the load control environment 102). The sensor device 141 may be positioned towards the load control environment 102 and may be capable of performing sensor measurement events in the load control environment 102. In one example, the sensor device 141 may be affixed or attached to a window 104 of the load control environment 102 and operate as a window sensor that is capable performing sensor measurement events on light that is entering the load control environment 102 through the window 104. For example, the sensor device 141 may comprise an ambient light sensor capable of detecting when sunlight is directly shining into the sensor device 141, is reflected onto the sensor device 141, and/or is blocked by external means, such as clouds or a building based on the measured light levels being received by the sensor device 141 from outside the window. The sensor device 141 may send messages indicating the measured light level. Though illustrated as being external to the lighting fixtures 124, one or more sensor devices 141 may be mounted to one or more of the lighting fixtures 124 (e.g., on a lower or outward-facing surface of the lighting fixture 124). For example, one or more sensor devices 141 may be electrically coupled to a control circuit or a load control circuit of the load control devices 120 for performing control in response to the sensor measurement events of the sensor devices 141.

The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The input devices and the load control devices may be configured to communicate messages between one another on a communication link within the load control system 100. The communication link between control devices in the load control system may comprise one or more network communication links through which messages may be transmitted for performing end-to-end communications in the load control system 100. For example, the input devices and the load control devices may be capable of communicating messages directly to one another via the RF signals 108. The RF signals 108 may be transmitted using a proprietary RF protocol, such as the CLEAR CONNECT protocol (e.g., CLEAR CONNECT TYPE A and/or CLEAR CONNECT TYPE X protocols). Alternatively, the RF signals 108 may be transmitted using a different RF protocol, such as, a standard protocol, for example, one of WIFI, cellular (e.g., 3G, 4G LTE, 5G NR, or other cellular protocol), BLUETOOTH, BLUETOOTH LOW ENERGY (BLE), ZIGBEE, Z-WAVE, THREAD, KNX-RF, ENOCEAN RADIO protocols, or a different protocol. In an example, the input devices may transmit messages to the load control devices via the RF signals 108 that comprise input events (e.g., button presses, sensor measurement events, or other input event) or control instructions generated in response to the input events for performing control of the electrical loads controlled by the load control devices. Though communication links may be described as a wireless communication links, wired communication links may similarly be implemented for enabling communications herein.

For devices in the load control system 100 to recognize messages directed to the device and/or to which to be responsive, the devices may be associated with one another by performing an association procedure. For example, for a load control device to be responsive to messages from an input device, the input device may first be associated with the load control device. As one example of an association procedure, devices may be put in an association mode for sharing a unique identifier for being associated with and/or stored at other devices in the load control system 100. For example, an input device and a load control device may be put in an association mode by the user 192 actuating a button on the input device and/or the load control device. The actuation of the button on the input device and/or the load control device may place the input device and/or the load control device in the association mode for being associated with one another. In the association mode, the input device may transmit an association message(s) to the load control device (directly or through one or more other devices as described herein). The association message from the input device may include a unique identifier of the input device. The load control device may locally store the unique identifier of the input device in association information, such that the load control device may be capable of recognizing messages (e.g., subsequent messages) from the input device that may include load control instructions or commands. The association information stored at the load control device may include the unique identifiers of the devices with which the load control device is associated. The load control device may be configured to respond to the messages from the associated input device by controlling a corresponding electrical load according to the load control instructions received in the messages. The input device may also store the unique identifier of the load control device with which it is being associated in association information stored locally thereon. A similar association procedure may be performed between other devices in the load control system 100 to enable each device to perform communication of messages with associated devices. This is merely one example of how devices may communicate and be associated with one another and other examples are possible.

According to another example, one or more devices may receive system configuration data (e.g., or subsequent updates to the system configuration data) that is uploaded to the devices and that specifies the association information comprising the unique identifiers of the devices for being associated. The system configuration data may comprise a load control dataset that defines the devices and operational settings of the load control system 100. The system configuration data may include information about the devices in the user environment 102 and/or the load control system 100. The system configuration data may include association information that indicates defined associations between devices in the load control system 100. The association information may be updated using any of the association procedures described herein.

One or more intermediary devices may also maintain association information that includes the unique identifiers that make up the associations of other devices in the load control system 100. For example, the input devices and the load control devices may communicate on a communication link in the load control system 100 through one or more other intermediary devices, such as router devices or other devices in a network. The intermediary devices may comprise input devices, load control devices, a central processing device, or another intermediary device capable of enabling communication between devices in the load control system. The association information that is maintained on the intermediary devices may comprise the unique identifiers of the devices that are associated with one another for identifying and/or enabling communication of messages between devices in the load control system 100. For example, an intermediary device may identify the unique identifiers being transmitted in association messages between devices during the association procedure and store the unique identifiers of the devices as an association in the association information. The intermediary devices may use the association information for monitoring and/or routing communications on a communication link between devices in the load control system 100. In another example, the association information of other devices may be uploaded to the intermediary device and/or communicated from the intermediary device to the other devices for being locally stored thereon (e.g., at the input devices and/or load control devices).

The load control system 100 may comprise a system controller 110. The system controller 100 may operate as an intermediary device, as described herein. For example, the system controller 110 may operate as a central processing device for one or more other devices in the load control system 100. The system controller 110 may operable to communicate messages to and from the control devices (e.g., the input devices and the load control devices). For example, the system controller 110 may be configured to receive messages from the input devices and transmit messages to the load control devices in response to the messages received from the input devices. The system controller 110 may route the messages based on the association information stored thereon. The input devices, the load control devices, and the system controller 110 may be configured to transmit and receive the RF signals 108 and/or over a wired communication link. The system controller 110 may be coupled to one or more networks, such as a wireless or wired local area network (LAN), e.g., for access to the Internet. The system controller 110 may be wirelessly connected to the networks using one or more wireless protocols. The system controller 110 may be coupled to the networks via a wired communication link, such as a network communication bus (e.g., an Ethernet communication link).

The system controller 110 may be configured to communicate via the network with one or more computing devices, e.g., a mobile device 190, such as, a personal computing device and/or a wearable wireless device. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone, a laptop, and/or a tablet device. Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The mobile device 190 may be configured to transmit messages to the system controller 110, for example, in one or more Internet Protocol packets. For example, the mobile device 190 may be configured to transmit messages to the system controller 110 over the LAN and/or via the Internet. The mobile device 190 may be configured to transmit messages over the Internet to an external service, and then the messages may be received by the system controller 110. The mobile device 190 may transmit and receive RF signals 109. The RF signals 109 may be the same signal type and/or transmitted using the same protocol as the RF signals 108. Alternatively, or additionally, the mobile device 190 may be configured to transmit RF signals according to another signal type and/or protocol.

The load control system 100 may comprise other types of computing devices coupled to the network, such as a desktop personal computer (PC), a wireless-communication-capable television, or any other suitable Internet-Protocol-enabled device. Examples of load control systems operable to communicate with mobile and/or computing devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using, for example, the mobile device 190 or other computing device (e.g., when the mobile device is a personal computing device). The mobile device 190 may execute a graphical user interface (GUI) configuration software for allowing a user 192 to program how the load control system 100 will operate. For example, the configuration software may run as a PC application or a web interface. The configuration software and/or the system controller 110 (e.g., via instructions from the configuration software) may generate the system configuration data that may include the load control dataset that defines the operation of the load control system 100. For example, the load control dataset may include information regarding the operational settings of different load control devices of the load control system (e.g., the lighting control device 120, the plug-in load control device 140, the motorized window treatments 150, and/or the thermostat 160). The load control dataset may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS.

Figure 1B:
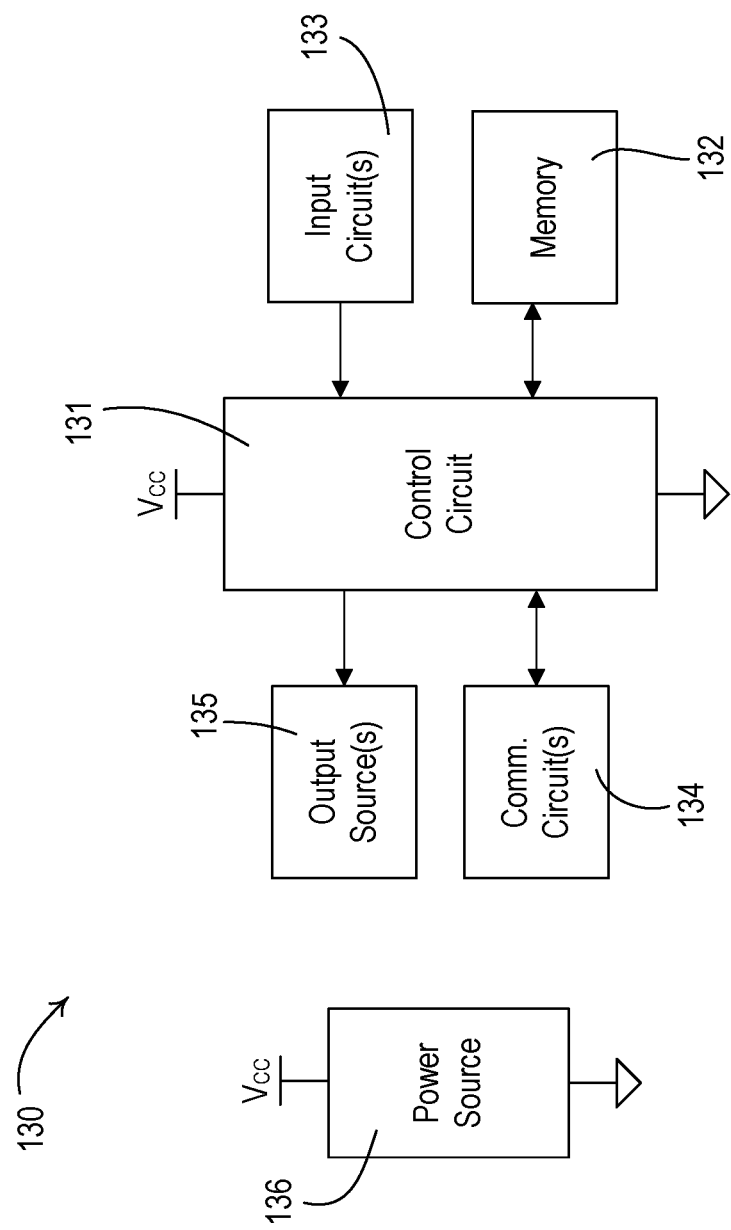
FIG. 1B is a block diagram illustrating an example of a device capable of processing and/or communication in a load control system, such as the load control system of FIG. 1A.

FIG. 1B is a block diagram illustrating an example of a device 130 capable of processing and/or communication in a load control system, such as the load control system 100 of FIG. 1A. In an example, the device 130 may be a control device capable of transmitting or receiving messages. The control device may be in an input device, such as a sensor device 141 (e.g., an occupancy sensor or another sensor device), a remote control device 170, or another input device capable of transmitting messages to load control devices or other devices in the load control system 100. The device 130 may be a computing device, such as the mobile device 190, the system controller 110, or another computing device in the load control system 100.

The device 130 may include a control circuit 131 for controlling the functionality of the device 130. The control circuit 131 may include one or more general purpose processors, special purpose processors, conventional processors, digital signal processors (DSPs), microprocessors, integrated circuits, a programmable logic device (PLD), application specific integrated circuits (ASICs), or the like. The control circuit 131 may perform signal coding, data processing, image processing, power control, input/output processing, or any other functionality that enables the device 131 to perform as one of the devices of the load control system (e.g., load control system 100) described herein.

The control circuit 131 may be communicatively coupled to a memory 132 to store information in and/or retrieve information from the memory 132. The memory 132 may comprise a computer-readable storage media or machine-readable storage media that maintains a device dataset of associated device identifiers, network information, and/or computer-executable instructions for performing as described herein. For example, the memory 132 may comprise computer-executable instructions or machine-readable instructions that include one or more portions of a procedure for transmitting or receiving multicast messages in multicast slots, as described herein for enabling communications on a network. The control circuit 131 may access the instructions from memory 132 for being executed to cause the control circuit 131 to operate as described herein, or to operate one or more devices as described herein.

The memory 132 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 132 may be implemented as an external integrated circuit (IC) or as an internal circuit of the control circuit 131.

The device 130 may include one or more communication circuits 134 that are in communication with the control circuit 131 for sending and/or receiving information as described herein. The communication circuit 134 may perform wireless and/or wired communications. The communication circuit 134 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 134 may be configured to communicate via power lines (e.g., the power lines from which the device 130 receives power) using a power line carrier (PLC) communication technique. The communication circuit 134 may be a wireless communication circuit including one or more RF or infrared (IR) transmitters, receivers, transceivers, or other communication circuits capable of performing wireless communications.

Though a single communication circuit 134 may be illustrated, multiple communication circuits may be implemented in the device 130. The device 130 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and the second communication circuit may be configured to communicate via a second wireless communication link (e.g., a short-range or direct wireless communication link) using a second wireless protocol (e.g., a short-range wireless communication protocol, such as the BLUETOOTH and/or BLUETOOTH LOW ENERGY (BLE) protocols).

One of the communication circuits 134 may comprise a beacon transmitting and/or receiving circuit capable of transmitting and/or receiving beacon messages via a short-range RF signal. The control circuit 131 may communicate with beacon transmitting circuit (e.g., a short-range communication circuit) to transmit beacon messages. The beacon transmitting circuit may communicate beacons via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacons are transmitted (e.g., the beacon transmitting circuit is configured to transmit and receive beacon messages). The information received at the beacon transmitting circuit may be provided to the control circuit 131.

The control circuit 131 may be in communication with one or more input circuits 133 from which inputs may be received. The input circuits 133 may be included in a user interface for receiving inputs from the user. For example, the input circuits 133 may include an actuator (e.g., a momentary switch that may be actuated by one or more physical buttons) that may be actuated by a user to communicate user input or selections to the control circuit 131. In response to an actuation of the actuator, the control circuit 131 may enter an association mode, transmit association messages from the device 130 via the communication circuits 134, and/or receive other information (e.g., control instructions for performing control of an electrical load). In response to an actuation of the actuator to perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 131 of the device 130 may enter the association mode, transmit an association message, transmit control instructions, or perform other functionality in response to an actuation or input from the user on the touch sensitive surface.

The input circuits 133 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the device 130). The control circuit 131 may receive information from the one or more input circuits 133 and process the information for performing functions as described herein.

The control circuit 131 may be in communication with one or more output sources 135. The output sources 135 may include one or more indicators (e.g., visible indicators, such as LEDs) for providing indications (e.g., feedback) to a user. The output sources 135 may include a display (e.g., a visible display) for providing information (e.g., feedback) to a user. The control circuit 131 and/or the display may generate a graphical user interface (GUI) generated via software for being displayed on the device 130 (e.g., on the display of the device 130).

The user interface of the device 130 may combine features of the input circuits 133 and the output sources 135. For example, the user interface may have buttons that actuate the actuators of the input circuits 133 and may have indicators (e.g., visible indicators) that may be illuminated by the light sources of the output sources 135. In another example, the display and the control circuit 131 may be in two-way communication, as the display may display information to the user and include a touch screen capable of receiving information from a user. The information received via the touch screen may be capable of providing the indicated information received from the touch screen as information to the control circuit 131 for performing functions or control.

Each of the hardware circuits within the device 130 may be powered by a power source 136. The power source 136 may include a power supply configured to receive power from an alternating-current (AC) power supply or direct-current (DC) power supply, for example. In addition, the power source 136 may comprise one or more batteries. The power source 136 may produce a supply voltage $V_{CC}$ for powering the hardware within the device 130.

Figure 1C:
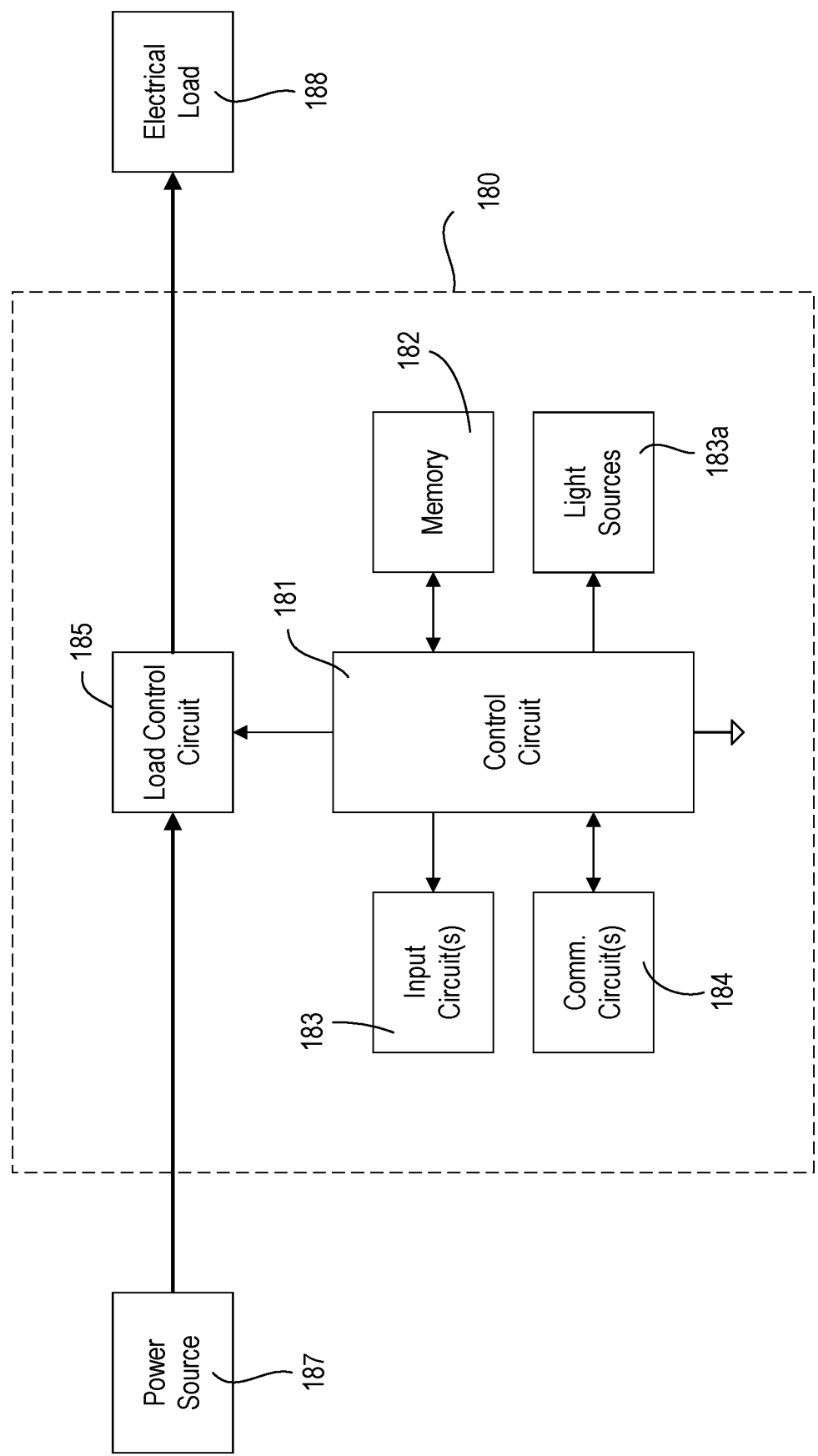
FIG. 1C is a block diagram illustrating an example of a load control device capable of operating in a load control system, such as the load control system of FIG. 1A.

FIG. 1C is a block diagram illustrating an example load control device 180. The load control device 180 may be a lighting control device (e.g., the lighting control device 120), a motorized window treatment (e.g., the motorized window treatments 150), a plug-in load control device (e.g., the plug-in load control device 140), a temperature control device (e.g., the temperature control device 160), an audio device (e.g., speaker 146), a dimmer switch, an electronic switch, an electronic ballast for lamps, and/or another load control device.

The load control device 180 may include a control circuit 181 for controlling the functionality of the load control device 180. The control circuit 181 may include one or more general purpose processors, special purpose processors, conventional processors, digital signal processors (DSPs), microprocessors, integrated circuits, a programmable logic device (PLD), application specific integrated circuits (ASICs), or the like. The control circuit 181 may perform signal coding, data processing, image processing, power control, input/output processing, or any other functionality that enables the load control device 180 to perform as one of the devices of the load control system (e.g., load control system 100) described herein.

The load control device 180 may include a load control circuit 185 that may be electrically coupled in series between a power source 187 (e.g., an AC power source and/or a DC power source) and an electrical load 188. The control circuit 181 may be configured to control the load control circuit 185 for controlling the electrical load 188, for example, in response to received instructions. The electrical load 188 may include a lighting load, a motor load (e.g., for a ceiling fan and/or exhaust fan), an electric motor for controlling a motorized window treatment, a component of a heating, ventilation, and cooling (HVAC) system, a speaker, or any other type of electrical load.

The control circuit 181 may be communicatively coupled to a memory 182 to store information in and/or retrieve information from the memory 182. The memory 182 may comprise a computer-readable storage media or machine-readable storage media that maintains a device dataset of associated device identifiers, network information, and/or computer-executable instructions for performing as described herein. For example, the memory 182 may comprise computer-executable instructions or machine-readable instructions that include one or more portions of a procedure for transmitting or receiving multicast messages in multicast slots as described herein for enabling communications on a network. The control circuit 181 may access the instructions from memory 182 for being executed to cause the control circuit 181 to operate as described herein, or to operate one or more devices as described herein. The memory 182 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 182 may be implemented as an external integrated circuit (IC) or as an internal circuit of the control circuit 181.

The load control device 180 may include one or more communication circuits 184 that are in communication with the control circuit 181 for sending and/or receiving information as described herein. The communication circuit 184 may perform wireless and/or wired communications. The communication circuit 184 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 184 may be configured to communicate via power lines (e.g., the power lines from which the device 180 receives power) using a power line carrier (PLC) communication technique. The communication circuit 184 may be a wireless communication circuit including one or more RF or IR transmitters, receivers, transceivers, or other communication circuits capable of performing wireless communications.

Though a single communication circuit 184 may be illustrated, multiple communication circuits may be implemented in the device 180. The device 180 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and the second communication circuit may be configured to communicate via a second wireless communication link (e.g., a short-range or direct wireless communication link) using a second wireless protocol (e.g., a short-range wireless communication protocol, such as the BLUETOOTH and/or BLUETOOTH LOW ENERGY (BLE) protocols).

One of the communication circuits 184 may comprise a beacon transmitting and/or receiving circuit capable of transmitting and/or receiving beacon messages via a short-range RF signal. A control circuit 181 may communicate with beacon transmitting circuit (e.g., a short-range communication circuit) to transmit beacon messages. The beacon transmitting circuit may communicate beacon messages via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacon messages are transmitted (e.g., the beacon transmitting circuit is configured to transmit and receive beacon messages). The information received at the beacon transmitting circuit may be provided to the control circuit 181.

The control circuit 181 may be in communication with one or more input circuits 183 from which inputs may be received. The input circuits 183 may be included in a user interface for receiving inputs from the user. For example, the input circuits 183 may include an actuator (e.g., a momentary switch that may be actuated by one or more physical buttons) that may be actuated by a user to communicate user input or selections to the control circuit 181. In response to an actuation of the actuator, the control circuit 181 may enter an association mode, transmit association messages from the load control device 180 via the communication circuits 184, and/or receive other information. In response to an actuation of the actuator may perform control by controlling the load control circuit 185 to control the electrical load 188, and/or by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 181 of the load control device 180 may enter the association mode, transmit an association message, control the load control circuit 185, transmit control instructions, or perform other functionality in response to an actuation or input from the user on the touch sensitive surface.

The input circuits 183 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the load control device 180). The control circuit 181 may receive information from the one or more input circuits 183 and process the information for performing functions as described herein.

The control circuit 181 may illuminate a light sources 183*a* (e.g., LEDs) to provide feedback to a user. The control circuit 181 may be operable to illuminate the light sources 183*a* different colors. The light sources 183*a* may be illuminated by, for example, one or more light-emitting diodes (LEDs).

Referring again to FIG. 1A, a network may be used to facilitate communication between the respective devices (e.g., control devices, intermediary devices, etc.) of the load control system 100. For a respective device to communicate via the network, the devices may join the network, for example, by initiating a commissioning procedure. The commission procedure may include a claiming procedure, a joining procedure, and/or an attachment procedure. The claiming procedure may be used to discover and claim devices for being added to the network. For example, devices in the load control system (e.g., the load control system 100 shown in FIG. 1A) may be claimed using a user's mobile device (e.g., the mobile device 190). Each device may be claimed by a user's mobile device 190 for joining the network (e.g., via a joining procedure, as described herein), and/or attaching to other devices on the network (e.g., via an attachment procedure, as described herein). Each device may transmit a beacon (e.g., a device beacon) via a short-range wireless communication link. The mobile device 190 may discover (e.g., receive) beacons transmitted by the devices in the load control system. Each beacon may include a unique beacon identifier of the device that transmitted the respective beacon. The unique beacon identifier may include a unique device identifier (e.g., serial number) of the device itself.

The mobile device 190 may identify one or more device beacons from which a respective beacon was received at a communication quality metric (e.g., received signal strength indicator (RSSI) or other communication quality metric) above a predefined value. For example, the mobile device 190 may identify one or more of the beacons transmitting the beacons that are received having the strongest receives signal strength indicators, and the mobile device 190 may transmit a connection message to the control device(s). The device may receive the connection message from the mobile device 190 may be configured to establish a connection (e.g., a two-way communication connection) with the mobile device 190.

The connection message may indicate to the device that the device has been selected for claiming. The connection message may operate as a claiming message, or a separate claiming message may be sent after the connection is established between the mobile device 190 and the device. The claiming message may indicate that the device has been claimed for being added to the network. In response to receiving the claiming message, the device may transmit a claim confirmation message to the mobile device 190. The claim confirmation message may include a configuration information that may be used to join the device to the network. For example, the configuration information may include a unique device identifier (e.g., serial number) of the device and/or network credentials for joining a network. The network credentials may include a network key for the network, a network address for the control device (e.g., a network address) and/or a joiner identifier for the device. The network address and/or the joining identifier may be used during the joining procedure to allow the device to join the network.

The user 192 may continue to move the mobile device 190 around the load control environment 102 in which the load control system is installed to perform the claiming procedure with additional devices. When the user 192 is done claiming devices (e.g., the mobile device 190 has claimed each of the devices or a portion of the devices of the load control system), the mobile device 190 may upload the configuration information from the claimed devices to a central processing device, such as a system controller (e.g., the system controller 110). The uploaded configuration information may be used to identify the devices for being joined to the network. As described herein, the system controller 110 may be installed at the space being commissioned, or may be a remote computing device. Though the mobile device 190 is described as the device performing communications with the control device(s), other devices in the load control system 100 may perform similar communications with the control device(s) during the claiming procedure. For example, the system controller 110, or another computing device in the load control system 100 may be implemented as described herein.

During the joining procedure, the control device may look for a network to join. For example, the control device may begin the joining procedure after being claimed using the claiming procedure. As described herein, during the joining procedure, the control device may transmit and/or receive joining messages (e.g., message to join a wireless network, such as joining request messages and/or joining response messages). As a result of the joining procedure, and as further described herein, the control device may be configured with a network key that may allow the device to send and/or receive messages over the network.

After the control device joins the network, the control device may, for example, attempt to attach to another device (e.g., a leader device or a router device) on the network to form the mesh network (e.g., formation of the network). In order to attach to another device on the network, the control device may send and receive a number of attachment messages via the network.

Figure 2A:
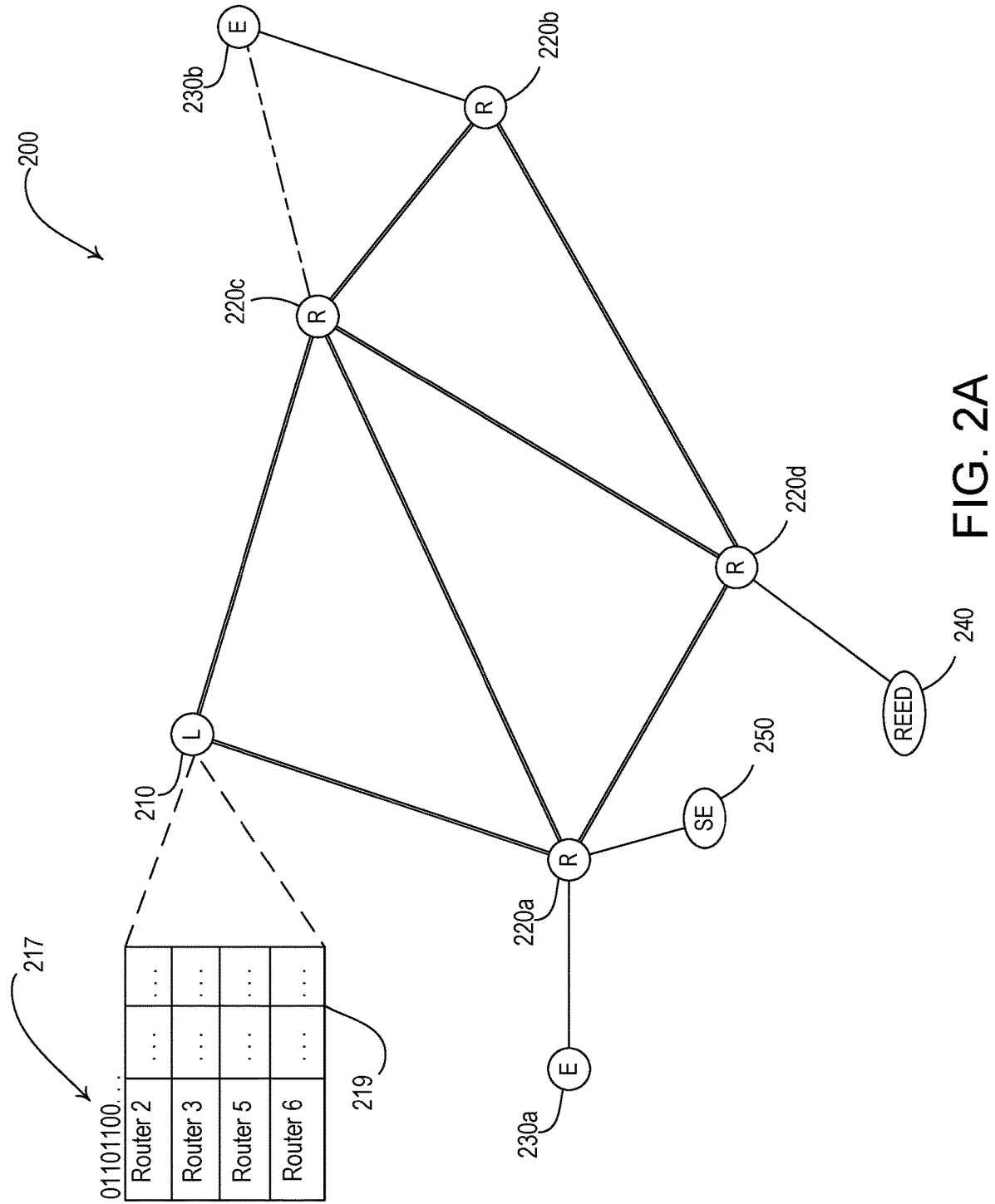
FIGS. 2A and 2B are diagrams of example networks for communication within the load control system of FIG. 1A.
Figure 2B:
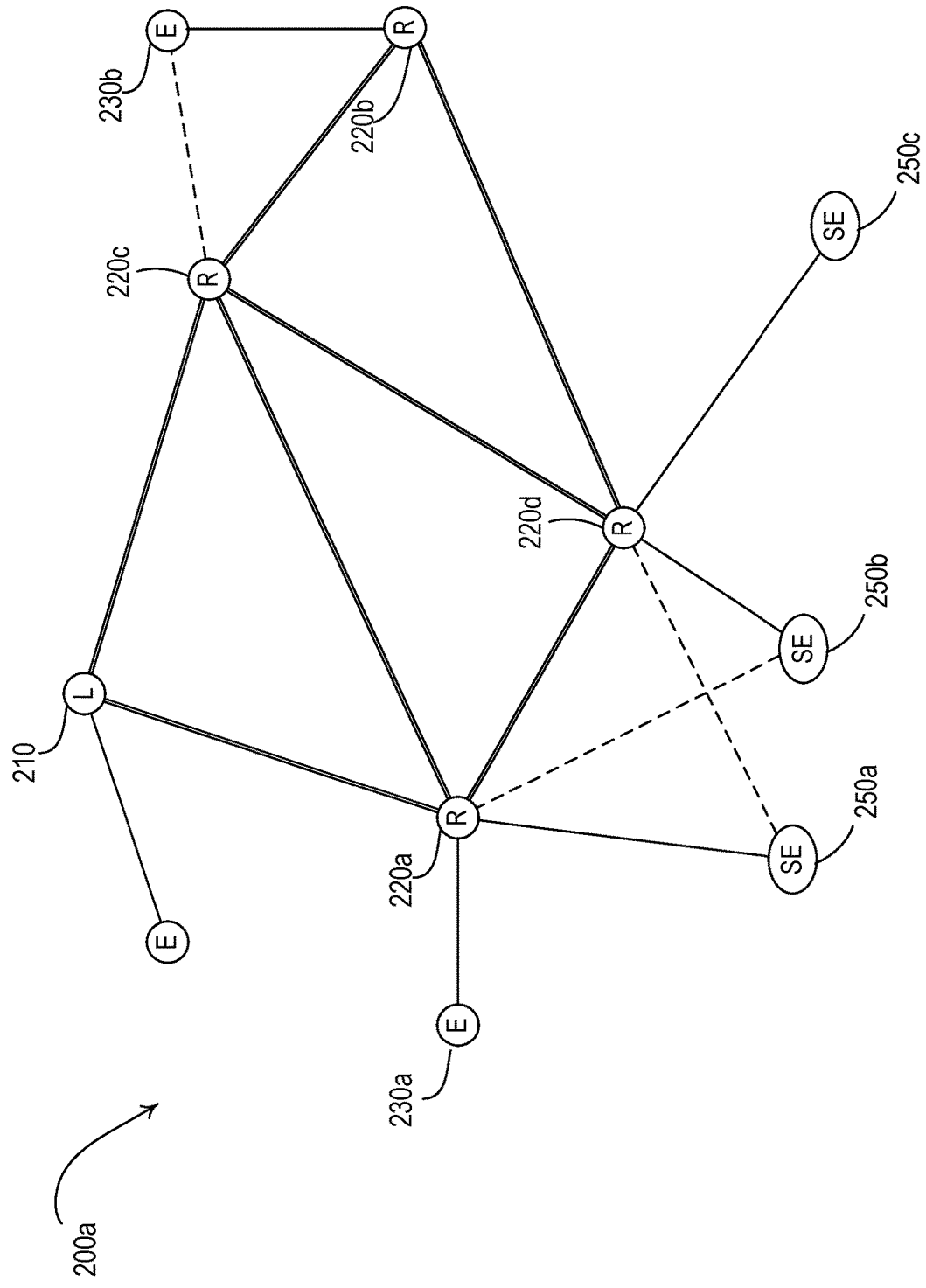

Each of the devices in the load control system 100 may communicate with one another via a wired and/or wireless network. FIGS. 2A and 2B are illustrations of example networks 200, 200a, which may be used to facilitate communication in a load control system (e.g., the load control system 100).

FIG. 2A is an illustration of an example network 200 that may allow for communication between devices in a load control system (e.g., communication between the control devices, intermediary device, etc. of the load control system 100 shown in FIG. 1A). The network 200 may include any suitable network to facilitate communications in a load control system. For example, the network 200 may be a mesh network on which devices communicate using a mesh network wireless communication protocol (e.g., the THREAD protocol or other suitable protocol). The various devices of the load control system 100 may communicate with each other via the network 200. As shown in FIG. 2A, the network 200 may comprise a single network partition. In addition, the network 200 may be an example of a network partition (e.g., a subnetwork or subnet) within a larger network. For example, the network 200 may be an example of a network partition within a larger network composed of a plurality of network partitions. The network 200 is an example network and the techniques described herein may be applied to other networks, for example, that include more devices or fewer devices than the network 200.

The circled nodes of FIG. 2A may represent devices that are attached to other devices on the network 200 (e.g. the various devices of the load control system 100). A control device that is attached to at least one other device on the network 200 may communicate with the other devices (e.g., that are attached to another control device on the network 200). Communication within the network 200 may be facilitated by the network communication links (e.g., attachments) established within the network 200. Referring to FIG. 2A, the network communication links between the devices may be indicated by lines (e.g., solid and dashed lines) that connect the respective devices.

The devices that are attached to at least one other device on the network 200 may take on and/or be assigned a respective role in the network. For example, the roles may include: a leader device (e.g., leader device 210), a router device (e.g., router devices 220a-220d), an end device (e.g., end devices 230a and 230b), a router eligible end device (REED) (e.g., router eligible end device 240), a parent device, a child device, and/or a sleepy-end device (e.g., sleepy-end device 250). The role of a device may indicate the functions and/or capabilities of the device with respect to the network 200. As described herein, end devices may include end devices (e.g., end devices 230a and 230b), router eligible end devices (e.g., router eligible end device 240), and/or a sleepy-end devices (e.g., sleepy-end device 250).

Each of the devices (e.g., including the input devices and/or load control devices described herein) in the load control system 100 may draw on a greater power supply (e.g., a continuous power source, such as an alternating-current (AC) power source), and/or a lower power supply. Devices powered by the greater power supply (e.g., a continuous power source, such as an alternating-current (AC) power source) may operate as a leader device, a router device, and/or an end device, including a router-eligible end device. Devices that draw on the lower power supply may operate as end devices and may be defined as a sleepy-end device in the network. The sleepy-end device may be a power-conservative device that may operate using sleep cycles that have sleep periods to conserve power during a sleep state (e.g., by turning off the communication circuit) and wake periods that may use more power during a wake state (e.g., by turning on the communication circuit to transmit and/or receive messages). For example, a power-conservative device may be a power-conservative control device. Though embodiments may be described herein as being performed using a sleepy-end device or power-conservative control device, other types of power-conservative devices may be similarly implemented in those embodiments.

As illustrated in FIG. 2A, the network 200 may include a leader device 210 and one or more router devices 220a-220d. The leader device 210 may manage other devices on the network 200. For example, the leader device 210 may assign and maintain router identifiers (e.g., router IDs) for each of the router devices 220. For example, each of the router devices 220a-220d may be assigned a unique router identifier. The leader device 210 may assign and maintain the roles of other devices. The leader device 210 may be configured as the gateway for the network 200. For example, the leader device may be a control device that facilitates communication (e.g., routes and receives messages to and from) between the network 200 and other networks or network partitions. Referring to FIG. 1A, a system controller (e.g., the system controller 110 shown in FIG. 1A) may be an example of a leader device 210. In addition, a control device within a load control system that is capable of being assigned to the role of a router device may be assigned to the role of the leader device.

The leader device 210 may support and be attached to multiple router devices (e.g., 64 router devices, 32 router devices, or another number of router devices that may be defined for the network 200). The leader device 210 may operate as a router device. The router devices 220a-220d on the network 200 (e.g., attached to the leader device 210 on the network 200) may be in communication with each other, for example, to form a mesh network. The router devices 220a-220d may be in communication with one another via network communication links (e.g., as indicated by the double solid lines connecting the router devices 220a-220d). The router devices 220a-220d may be in communication with the leader device 210, either directly or through one or more other router devices (e.g., as indicated by the solid lines connecting the leader device 210 to the router devices 220a and 220c). The router devices 220a-220d may receive and route messages to other devices on the network 200 (e.g., the end devices 230a, 230b, the router eligible end device 240, and/or the sleepy-end device 250). For example, the router devices 220a-220d may receive and/or transmit messages between devices, or between each other for communicating messages received from an attached device to another device attached to another router device. Referring now to the load control system 100, a device that is, for example, externally powered (e.g., a device that is not battery powered) may be assigned to the role of a router device, such as, the system controller 110, the lighting control device 120, the plug-in load control device 140, the motorized window treatments 150, and/or the thermostat 160.

The network 200 may include one or more end devices 230a, 230b (e.g., full or minimal end devices). The end devices 230a, 230b may be attached to another device (e.g., a parent device, such as the leader device 210 and/or the router devices 220a, 220b, 220c, 220d) on the network 200 and may transmit and/or receive messages via its attached parent device (e.g., leader device and/or router device). Though two end devices 230a, 230b are shown in FIG. 2A, and each is attached to different router devices, each router device 220a-220d may support multiple end devices (e.g., more than 500 end devices). The system controller 110, input devices (e.g., the remote control device 170), and/or load control devices (e.g., the lighting control devices 120, the plug-in load control device 140, the motorized window treatments 150, and/or the thermostat 160) may be examples of the end devices 230a, 230b.

Referring again to FIG. 2A, the network 200 may include the router eligible end device 240. The router eligible end device 240 may be an end device that is capable (e.g., hardware capable and/or software capable) of becoming a leader device and/or a router device. In certain situations, the role of the router eligible end device 240 may be updated to a leader device and/or a router device. For example, when the router eligible end device 240 identifies itself as being within reach of an end device attempting to attach to the network 200, the router eligible end device 240 may upgrade itself to the role of a router device. The router eligible end device 240 may transmit and/or receive messages via the attached router device 220d. As shown in FIG. 2A, the router eligible end device 240 may be one of the end devices that is attached to the router device 220d. The system controller 110, the lighting control devices 120, the plug-in load control device 140, the motorized window treatments 150, and/or the thermostat 160 may be examples of the router eligible end device 240. Referring now to the load control system 100, a control device that is, for example, externally powered (e.g., a control device that is not battery powered) may be assigned to the role of a router eligible end device, such as, the system controller 110, the lighting control devices 120, the plug-in load control device 140, the motorized window treatments 150, and/or the thermostat 160.

The network 200 may include the sleepy-end device 250. The sleepy-end device 250 may include, or may be similar to, an end device. For example, the sleepy-end device 250 may be an end device that is powered by a finite power source (e.g., a battery). The sleepy-end device 250 may be aware of its role as a sleepy-end device based on, for example, an indication that is stored at the sleepy-end device 250. Communication with the sleepy-end device 250 may be performed such that the finite power source is preserved and/or is efficiently consumed. For example, the sleepy-end device 250 may periodically disable its communication circuit(s) in between message transmissions. While its communication circuit is enabled, the sleepy-end device 250 may transmit and/or receive messages via an attached router device 220a. As shown in FIG. 2A, the sleepy-end device 250 may turn off its communication circuit to conserve power. The wake state may be a high-power state, as the sleepy-end device 250 may turn on its communication circuit and/or process messages. The sleepy-end device 250 (e.g., as well as other power-conservative control devices) may consume power during the wake state, or other times of higher power usage, and reduce power consumption during the sleep state, or other times of lower power usage. For example, if the sleepy-end device 250 is a motorized window treatment that uses batteries for storing power, the sleepy-end device may minimize the current drawn from the batteries during times of lower power usage (e.g., time of decreased current draw). In addition, if the sleepy-end device 250 is a motorized window treatment that uses rechargeable batteries and/or super capacitors for storing power, the sleepy-end device may recharge the rechargeable batteries and/or super capacitors during times of lower power usage (e.g., time of decreased current draw).

Input devices (e.g., the remote control device 170) and/or load control devices (e.g., the motorized window treatments 150 when battery powered and/or battery-powered lighting control devices) may be examples of the sleepy-end device 250. In addition, sensors, such as sensor 141 (e.g., occupancy sensors, daylight sensors, shadow sensors, window sensors, and/or other sensors in a load control system), and/or other battery-powered input devices may be examples of sleepy-end devices. Load control devices, such as motorized window treatments 150 and/or other battery-powered load control devices may take on the role of a sleepy-end device in the network.

The leader device 210 may update the roles (e.g., or confirm role updates) of the devices communicating within the network 200, for example, based on changes to the network 200. In an example, a control device may be assigned to a certain role (e.g., the role of an end device) when the device attaches to the network 200, and the leader device 210 may update the role of the device based on changes in network conditions. Changes in network conditions may include: increased message traffic, attachment of other devices, changes in signal strength, etc. Updates to the assigned role of a control device may be based on the capabilities of the device. For example, the leader device 210 may update the role of a control device from a router eligible end device to a router device (e.g., as a router eligible end device is an end device that is eligible to perform the role of a router device). The leader device 210 may update the role of a control device to a router device by assigning a router identifier (ID) to the device.

As the leader device 210 updates the roles of the devices in the network 200, the leader device may maintain the number of router devices in the network 200 and/or the router identifiers in use in the network 200. For example, the leader device 210 may store and/or maintain a bitmap 217 that may be used to indicate the number of router devices and/or the router identifiers being used in the network 200. The bitmap 217 may include a number of bits that each correspond to a different router identifier being used in the network 200. In an example, the leader device 210 may support 64 router devices and the leader device 210 may store a 64-bit bitmap for tracking the router identifiers in use in the network 200. Each bit in the bitmap may indicate whether a router identifier is identified by the leader device 210 as being used (e.g., with a value of "1") or unused (e.g., with a value of "0"). The leader device 210 may determine that a device should be upgraded to a router device and, so long as a router identifier is available, assign a router identifier to the router device. The leader device 210 may downgrade router devices (e.g., to end devices) or remove router devices from the network 200. As router devices are added or removed, the bitmap 217 may be updated to indicate the number of router devices and/or router identifiers that are in use in the network 200.

The leader device 210 may send the bitmap 217 to the other router devices in the network 200. Each router device, including the leader device 210, may maintain network information about each of the router devices identified as being used in the network 200. For example, each router device may maintain network information about each of the router devices in a router table, such as the router table 219. For example, the network information in the router table 219 may identify the router devices in the network 200 and the quality of communications that a corresponding router device has with the other router devices being maintained in the router table stored locally thereon. Each router table, such as the router table 219, may include a row for each router identifier indicated in the bitmap 217. Each router device in the network, including the leader device 210, may perform communications on the network 200 based on the network information being stored and maintained in the locally stored router table. For example, a router device, such as the router devices 220a-220d and/or the leader device 210, may transmit messages differently within the network 200 based on the quality of the communications with corresponding router devices identified in the router table stored locally thereon.

The devices attached to the network 200 may further operate as parent devices and/or child devices. Leader devices (e.g., the leader device 210) and router devices (e.g., the router devices 220a-220d) that are attached to one or more end devices (e.g., the end devices 230a, 230b, the router eligible end device 240, and/or the sleepy-end device 250) may operate as parent devices. End devices (e.g., the end devices 230a, 230b, the router eligible end device 240, and/or the sleepy-end device 250) that are attached to a leader device (e.g., the leader device 210) or a router device (e.g., one of the router devices 220a-220d) may operate as child devices.

As shown in FIG. 2A, the relationships between child devices and a parent device may be indicated by solid lines. For example, router device 220a may be configured as the parent device of the end device 230a and the sleepy-end device 250. Similarly, the end device 230a and the sleepy-end device 250 may operate as child devices of router device 220a.

As parent devices, the leader device 210 and the router devices 220a-220d may each be attached to one or more child devices (e.g., one or more of the end devices 230a, 230b, the router eligible end device 240, and/or the sleepy-end device 250, as described herein). In addition, the leader device 210 and the router devices 220a-220d may store and/or relay messages that are sent by their respective attached child devices. For example, the leader device 210 and the router devices 220 may receive messages from their respective child devices and route the received messages to the intended recipient device (e.g., either directly to the intended recipient device, via the respective parent device of the intended recipient device, and/or to a router device or leader device this is on the path to the intended recipient). Similarly, the leader device 210 and the router devices 220a-220d may receive messages intended for their respective child device and route the message to the appropriate child device. The parent device of a respective sleepy-end device may schedule communications with the sleepy-end device when the communication circuit of the sleepy-end device is enabled.

The router device 220a may receive messages intended for the end device 230a and forward the message to the end device 230a. As the router device 220a is configured as the parent device of the end device 230a, the end device 230a may transmit messages to the router device 220a, and the router device 220a may route the message to the intended recipient. For example, when the end device 230a intends to transmit a message to the end device 230b, the end device 230a may initially transmit the message to the router device 220a. The router device 220a may route the message to the router device 220b (e.g., the parent device of the end device 230b). For example, the router device 220a may route the message to router device 220b via router device 220c or router device 220d, and the router device 220b may then forward to message to the end device 230b. In addition, as described herein and illustrated in FIG. 2A, the router device 220a may route the message to the end device 230b via the router device 220c (e.g., which may be an auxiliary parent device of the router device 230b).

Child devices may be configured to transmit unicast messages to and/or receive unicast messages from their respective parent device. A device may transmit unicast messages to another device in the network directly or via hops through other devices in the network. For example, a child device may transmit unicast messages to another device via the respective parent device of the child device. Each unicast message may be individually addressed to another control device by including a unique identifier of the device to which the unicast message being transmitted. Devices may generate separate unicast messages for each device with which they are communicating and address the unicast messages to each device independently. The unicast messages may also include the unique identifier of the device that is transmitting the unicast message. A device may determine that it is the intended recipient of a unicast message by identifying its own unique identifier in the unicast message.

Messages may be sent in the network using multicast messages and/or broadcast messages. A multicast message may be a type of broadcast message. Multicast messages may be sent to a group of devices in the network. A multicast message may include a group identifier. The devices that are members of the group may recognize the group identifier and process the message accordingly (e.g., may respond when member of the group). Broadcast messages may be sent to each device in the network capable of receiving the message. The broadcast messages may include an indication that the message is a broadcast message (e.g., a broadcast address). Each device that receives a broadcast message may process the message accordingly. A network may use either multicast messages or broadcast messages, and the two terms may be used unteachably herein.

The messages transmitted by a child device to its respective parent device may include an indication (e.g., a unique identifier) of the intended recipient, and the parent device may route the message accordingly. Referring again to FIG. 2A, the end device 230a may transmit messages to the router device 220a (e.g., the parent device of the end device 230a), and the router device 220a may route the message based on the intended recipient. For example, if the end device 230a transmits a message intended for the end device 230b, the router device 220a may route the message to the router device 220b (e.g., the parent device of the router eligible end device 230b) via the router device 220c or the router device 220d. For example, if the router device 220a routes the message via the router device 220d, the router device 220d may forward the message to the router device 220b, which may forward the message to the end device 230b. The router device 220a may identify that the router device 220b is the parent device to which the end device 230b is attached via a lookup table. As illustrated in FIG. 2A, multiple paths may exist to route messages over the network 200, and router devices may identify the shortest path (e.g., lowest number of hops) to transmit messages to a respective device.

Child devices may be configured to communicate with an auxiliary parent device (e.g., configured to communicate with more than one parent device). Referring to FIG. 2A, for example, the end device 230b may be configured to communicate with (e.g., transmit message to and receive messages from) a parent device, such as the router device 220b, which may be referred to as a primary parent device. The end device 230b may also be configured to synchronize with (e.g., receive messages from) an auxiliary parent device, such as the router device 220c (e.g., as illustrated by the long and short dashed lines in FIG. 2A). A child device may receive unicast messages from its parent device. A child device may also receive multicast messages (e.g., and/or broadcast messages) from its parent device and one or more auxiliary parent devices, which may increase the efficiency and reliability of child device receiving the messages. For example, the child device may receive network advertisement messages via an auxiliary parent device. The number of auxiliary parents that a child device is synchronized with may be limited to a threshold number of auxiliary parents (e.g., 3, 5, 10, etc.).

A child device may be attached to a single parent device and synchronized with one or more auxiliary parent devices. For example, the child device may send and/or receive unicast messages via the parent devices. Similarly, the child device may receive multicast messages via the one or more synchronized auxiliary parent devices. The number of auxiliary parent devices that a respective child device is synchronized with may be limited to a threshold number of synchronized auxiliary parents, which may be pre-defined and/or configured. A child device may attempt to synchronize with an auxiliary parent device by transmitting a message (referred to herein as a link request message) to the auxiliary parent device. For example, referring to FIG. 2A, the end device 230b may have transmitted a link request message to router 220c. The link request message may be used to request a network communication link between two devices. As descried herein, messages may be communicated between devices that share a network communication link. In response to receiving the link request message, the router device 220c may transmit a message (referred to herein as a link accept message) to the end device 230b. The link accept message may include information that allows the respective child device to decrypt messages from the auxiliary parent device (e.g., a frame counter). As described herein, when a child device is synchronized with an auxiliary parent device, the child device may receive multicast messages via the synchronized auxiliary parent device. For example, referring to FIG. 2A, the end device 230b may receive multicast messages via the parent device (e.g., router device 220b) and the auxiliary parent device (e.g., router device 220c), which may increase the efficiency and reliability of the child device 230b receiving multicast messages.

A child device may receive advertisement messages from a router device other than the parent device of the child device or a router device other than an auxiliary parent device of the child device. For example, the router device may transmit advertisement messages to enable other devices to determine that a network has been formed and that the device hearing the advertisement message may attempt to attach to the router device (e.g., to communicate via the network). Devices may receive and track the advertisement messages transmitted by router devices to determine whether the device is able to communicate via the network. Also, or alternatively, the advertisement messages transmitted by a respective router device may provide other router devices with the ability to measure a communication quality metric of the communication signal (e.g., via the received signal strength indicator value) between the respective routers attached to the network (e.g., which the router devices may use to update their respective routing tables or routing information). As described herein, the child device may measure the received signal strength indicator (RSSI) or another communication quality metric of the received advertisement messages.

Certain messages may be propagated and broadcast by multiple devices in the network 200, which may increase the likelihood that a respective child device hears a message. For example, rather than sending multiple transmissions, multicast messages that are substantially similar (e.g., messages that include the same load control instructions that are sent to multiple load control devices) may be broadcasted. Referring again to the load control system 100, an actuation of a button of the remote control device 170 may adjust the intensity of multiple lighting loads (e.g., the lighting load 122 and the plug-in lighting load 142) and a message may be broadcasted to adjust the respective lighting loads. In addition, the devices that receive the broadcast transmission may be configured to process and repeat (e.g., forward the message over the network or otherwise acting as a repeater) the message in response to receiving the broadcast transmission.

Child devices may create and maintain an auxiliary parent table. The auxiliary parent table may include a list of auxiliary parents with which a respective child device is configured to communicate (e.g., synchronized with and/or able to receive multicast messages from). In addition, the auxiliary parent table may include an indication of the communication quality metric (received signal strength (e.g., a received signal strength indicator)) for each of the auxiliary parent devices of the child device. For example, the auxiliary parent table may include a rolling average of the received signal strength indicators for each of the auxiliary parent devices of the child device. Child devices may similarly create and/or maintain a router table. The router table may include the router devices that a respective child device has received messages from (e.g., advertisement messages). In addition, the router table may include an indication of the received signal strength indicator or other communication quality metric of messages received from each of the router devices in the router table. Also, or alternatively, child devices may each maintain a router table. The router table may include each of the router devices that a respective child device has received messages from and a received signal strength indicator for each of the respective router devices. The router table may also include an indication of whether a respective router device is a parent device of the child device or an auxiliary parent device of the child device. As used herein, the term auxiliary parent table may refer to a separate table from the router table or a subset of the router table that includes the router devices that are synchronized auxiliary parent devices of the child device.

Figure 2C:
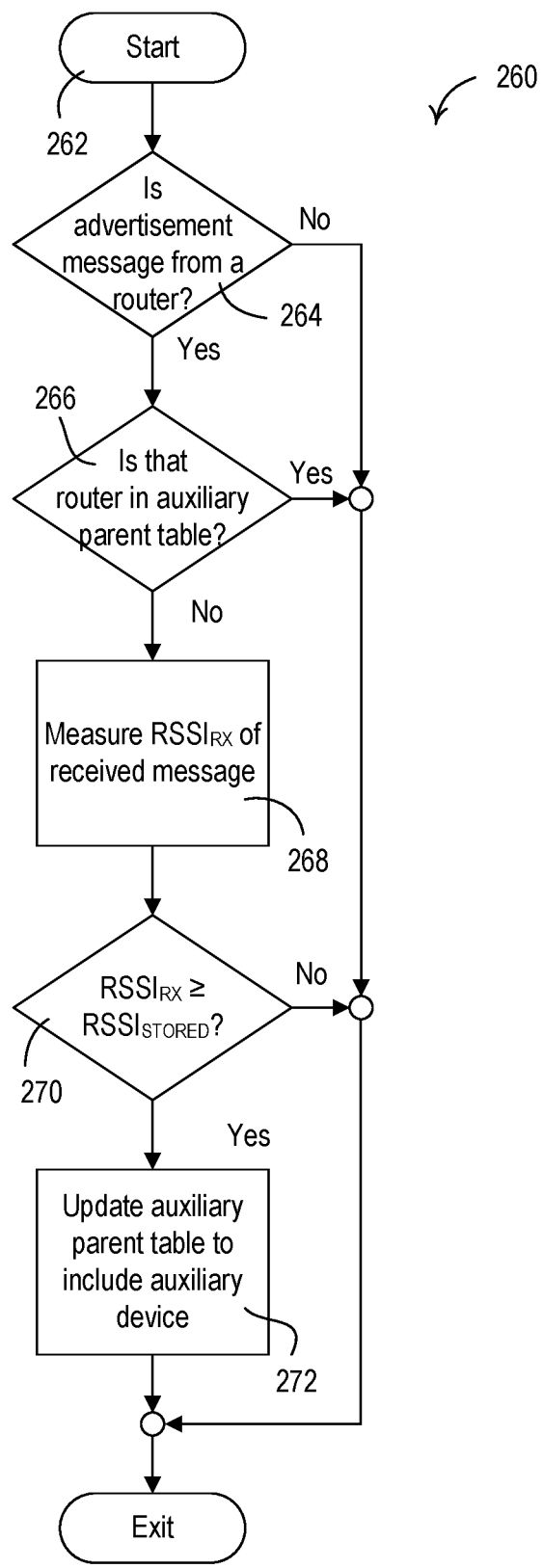
FIGS. 2C and 2D are diagrams illustrating example procedures for communicating with parent devices and/or auxiliary parent devices.

FIG. 2C is example flow chart of example procedure 260 performed by a child device (e.g., a control device of the load control system 100 illustrated in FIG. 1A) for creating and/or maintaining an auxiliary parent table. The auxiliary parent table may include a list of the auxiliary parent devices with which the child device may be synchronized for receiving multicast messages for processing at the child device. The auxiliary parent table may also include the parent device to which the child device is attached for receiving unicast messages and through which messages are transmitted to other devices in the network. Though implemented in a single table, a similar procedure may be performed in which the auxiliary router devices are maintained in one or more separate tables.

The procedure 260 may be performed by a control circuit of a control device in a load control system, such as the load control system 100 of FIG. 1A. The procedure 260 may be performed by a control circuit of a control device in a load control system, such as a control device of the load control system 100 illustrated in FIG. 1A. The procedure 260 may be performed by a control circuit of an end device, such as the end devices 230a, 230b and/or the router-eligible end device 240, for example. The control circuits of the end devices performing the procedure may be powered by a continuous power source (e.g., an alternating-current (AC) power source). The procedure 260 may be performed by the control circuits of the end devices that may be defined as sleepy-end devices that draw on the lower power supply in the network, such as sleepy-end device 250 shown in FIG. 2A.

At 262, the procedure 260 may begin. For end devices that are powered by a continuous power source, the control circuit may execute the procedure 260 in response to receiving a message on the network. As the sleepy-end devices may be power-conservative devices that may be asleep for sleep periods to conserve power, the control circuits of the sleepy-end devices may wake up for a discovery period and execute the procedure 260 each time a message is received during the discovery period. The control circuits of the sleepy-end devices may wake up for the discovery period after an expiration of a predefined period of time (e.g., once a day) to update the auxiliary parent table.

After receiving a message at 262 via the communication circuit, the control circuit of the control device that is performing the procedure 260 may determine at 264 whether the message is an advertisement message from a router device (e.g., a leader device, such as the leader device 210, and/or a router device, such as one of the router devices 220a-220d). If the advertisement message is not received from a router device at 264, the procedure 260 may end. If the advertisement message is received from a router device, the control circuit may determine whether the router device from which the advertisement message is received is already in the auxiliary parent table. If the control circuit determines that a unique identifier of the router device from which the advertisement message is received is already listed in the auxiliary parent table, either as the parent device (e.g., the router device in auxiliary parent table with highest communication quality metric) or an auxiliary parent device, the procedure 260 may end.

If the unique identifier of the router device from which the advertisement message is received is not already in the auxiliary parent table, the control circuit may determine (e.g., measure) a communication quality metric of the received message at 268. For example, the control circuit may measure a present received signal strength indicator $RSSI_{RX}$ of the received message at 268. The present received signal strength indicator $RSSI_{RX}$ may indicate the signal strength of the message and/or quality of communications from the router device from which the message was received to the control device. The control circuit may use the present received signal strength indicator $RSSI_{RX}$ or other communication quality metric to determine which of the plurality of router devices on the network to include in the auxiliary parent table as a parent device or an auxiliary parent device. The control circuit may have stored in memory (e.g., may have previously stored in memory) a stored received signal strength indicator $RSSI_{STORED}$ or other previously stored communication quality metric value, which may indicate the router device in the auxiliary parent table having the lowest received signal strength indicator or other communication quality metric.

The auxiliary parent table may include an RSSI value or other communication quality metric that corresponds to one or more messages (e.g., the last message, an average value of the messages received over time, etc.) received from each of the router devices in the auxiliary parent table. The stored received signal strength indicator $RSSI_{STORED}$ may be the stored received signal strength indicator of the router device in the auxiliary parent table having the lowest received signal strength indicator. In another example, the stored received signal strength indicator $RSSI_{STORED}$ may be a predefined value. The control circuit may compare the present received signal strength indicator $RSSI_{RX}$ to the stored received signal strength indicator $RSSI_{STORED}$ at 270. If the present received signal strength indicator $RSSI_{RX}$ is less than the stored received signal strength indicator $RSSI_{STORED}$, the procedure 260 may exit. If, however, the present received signal strength indicator $RSSI_{RX}$ is greater than or equal to the stored received signal strength indicator $RSSI_{STORED}$, the control circuit may update the auxiliary parent table to include the unique identifier of the router device from which the message was received. The control circuit may transmit a link request message to the auxiliary parent device that has been added to the auxiliary parent table and receive a link accept message that may include information that allows the control circuit to decrypt messages from the auxiliary parent device (e.g., a frame counter) to establish an auxiliary parent link. In addition, the control circuit may store the unique identifier (e.g., a router ID) for the router device and the present received signal strength indicator $RSSI_{RX}$ in memory in the auxiliary parent table.

Different types of end devices may create and maintain different sizes of auxiliary parent tables. For example, end devices may create and maintain larger auxiliary parent tables than sleepy-end devices. Some sleepy-end devices may create and maintain similar sized auxiliary parent tables as other end devices, while other sleepy-end devices may create and maintain smaller auxiliary parent tables than other sleepy-end devices and/or other end devices. For example, end devices that receive continuous power may be capable of creating and maintaining larger auxiliary parent tables than sleepy-end devices or certain sleepy-end devices. In another example, some sleepy-end devices may operate on a larger battery or power source than other sleepy-end devices, which may allow them to stay awake for larger periods (e.g., discovery periods) to create and maintain larger auxiliary parent tables. In an example, referring to FIG. 1A, the motorized window treatment 150 may include a larger battery than the remote control device 170 and, as such, may create and maintain a larger auxiliary parent table. The smaller auxiliary parent table may be limited to just a single parent device (e.g., the direct parent), or include less auxiliary parent devices (e.g., 1-2 auxiliary parents) than the larger auxiliary parent table (e.g., 10 auxiliary parents) created and maintained by other end devices and/or sleepy-end devices.

The end devices (e.g., including sleepy-end devices) may operate on a communication schedule that has been established by the parent device and auxiliary parent devices in their respective auxiliary parent tables. As such, the end devices may query the parent device and/or the auxiliary parent devices in the auxiliary parent table to identify the communication schedule that indicates the timing of communications being transmitted from the parent device and/or the auxiliary parent devices. In determining the communication schedule of their respective child devices, the router devices may consider the communications schedules of other devices communicating over the network (e.g., as an attempt to avoid multiple devices communicating over the network at the same time). For example, in establishing the communication schedules for end devices, the router devices may consider and listen to communications of other router devices. If, for example, another router device is communicating at a certain time, the router device may avoid scheduling communications for its end devices at that time. Also, or alternatively, a system-wide timing schedule may be established (e.g., a schedule of timing slots during which network communications may be scheduled), and the router devices may select a slot in which to schedule communications.

Figure 2D:
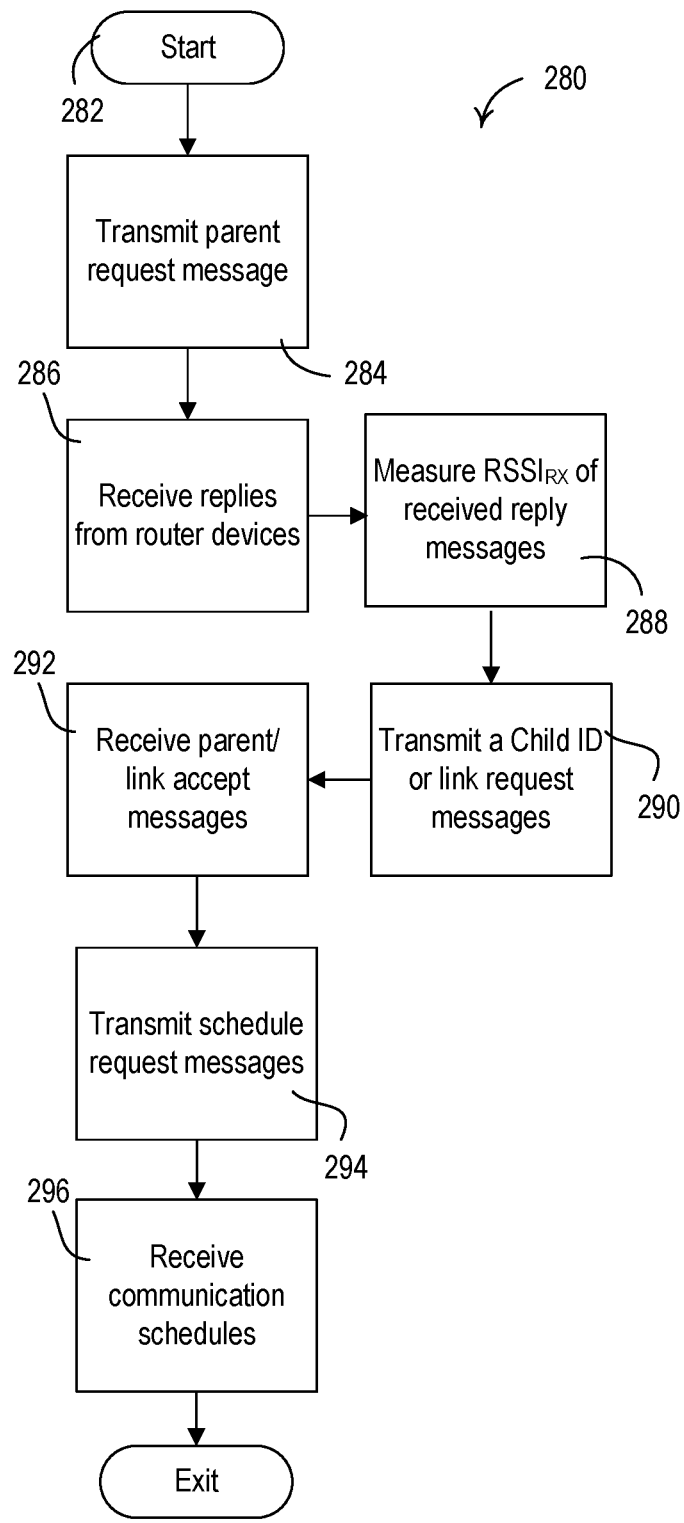

FIG. 2D is example flow chart of example procedure 280 performed by a control circuit of a control device for determining a parent device and/or the auxiliary parent devices to be included in an auxiliary parent table and determining a communication schedule for the parent device and/or the auxiliary parent devices in the auxiliary parent table. The procedure 280 may be performed by a control circuit of a control device in a load control system, such as a control device of the load control system 100 illustrated in FIG. 1A. The procedure 280 may be performed by a control circuit of an end device, such as the end devices 230a, 230b and/or the router-eligible end device 240, for example. The end devices performing the procedure may be powered by a continuous power source (e.g., an alternating-current (AC) power source). The procedure 280 may be performed by end devices that may be defined as sleepy-end devices that draw on the lower power supply in the network, such as sleepy-end device 250 shown in FIG. 2A.

At 282, the procedure 280 may begin. For example, the control circuit of the control device performing the procedure 280 may execute the procedure 280 when the control circuit attempts to attach to another device communicating over the network. The control circuit may also or alternatively perform the procedure 280 when the control circuit determines to attach to another parent device (e.g., when the control device loses its connection to its original parent device). At 284, the control circuit may transmit a parent request message. The parent request message may be responded to by router devices that receive the parent request message. The control circuit may receive replies to the parent request message via a communication circuit at 286. At 288, the control circuit may measure a received signal strength indicator $RSSI_{RX}$ of each of the replies to the parent request message. In response to the replies that are received, the control circuit may determine the parent device and/or the auxiliary parent devices to be included in the auxiliary parent table for listening to and/or from which multicast messages may be processed. At 290, the control circuit may transmit a child ID request message and/or a link request message via the communication circuit to the parent device and/or the auxiliary parent devices in the auxiliary parent table. For example, a child ID request message may be transmitted to establish an attachment between the control device and a parent device. Similarly, a link request message may be transmitted to establish a link between the control device and an auxiliary parent device. At 292, the control circuit may receive and parent accept and/or the link accept message from each of the parent device and/or the auxiliary parent devices that may include information that allows the control circuit to decrypt messages from each of the parent device and/or the auxiliary parent devices (e.g., a frame counter) to establish individual communication links.

The control circuit may transmit schedule request messages at 294 via the communication circuit. The schedule request messages may each request a communication schedule from the parent device and/or the auxiliary parent devices in the auxiliary parent table to determine the communication schedule of each of the sleepy-end devices. For a sleepy-end device, the communication schedule may allow the sleepy-end device to know when to wake up to receive multicast messages from each auxiliary parent device in the auxiliary parent table. The control circuit of the control device executing the procedure 280 may receive the communication schedules from each of the parent device and/or the auxiliary parent devices in the auxiliary parent table at 296 and store the communication schedules in memory. As described herein, the communication schedule of the control device may include timing for multicast slots and/or an offset from the control devices current awake and sleep schedules. The communication schedules may be used by the end devices to know when to listen to the parent device and/or the auxiliary parent devices in the auxiliary parent table, as described herein.

Referring to FIG. 1A, the remote control device 170 may operate as an end device or a sleepy-end device for communicating messages comprising indications of user input and/or control instructions for controlling another end device (e.g., the lighting control device 120, the plug-in load control device 140, the motorized window treatment 150, and/or the thermostat 160). The remote control device 170 may communicate via one or more intermediary parent devices, such as a leader device and/or a router device, for example. The leader device and/or the router device may communicate with one or more other leader devices and/or router devices in the network to route the messages to the other end device (e.g., lighting control device 120, the plug-in load control device 140, the motorized window treatment 150, and/or the thermostat 160) for performing load control.

A control device may attach to another device on a network or network partition (e.g., the network 200 shown in FIG. 2A) to enable the device to communicate (e.g., transmit and/or receive messages) via the network. A control device may initiate attachment to another device on a network by transmitting a parent request message to discover potential parent devices. A parent request message may be transmitted by a device to discover and/or attach to a parent device (e.g., router devices and/or leader devices). A control device may transmit the parent request message as a multicast message, for example, to identify devices that are attached to a network that can act as a parent device of the device. Similarly, a control device may initiate synchronization to another device on a network by transmitting a link request message to discover potential auxiliary parent devices. A link request message may be transmitted by a device to discover and/or synchronize to an auxiliary parent device (e.g., router devices and/or leader devices). A control device may transmit the link request message as a multicast message, for example, to identify devices that are attached to a network that can act as an auxiliary parent device of the device.

Potential parent devices (e.g., the leader device 210 and/or the router devices 220 of the network 200) that receive a parent request message (e.g., a multicast parent request message) may respond by transmitting a parent response message. For example, potential parent devices that receive a multicast parent request message may each transmit a parent response message (e.g., as a unicast message) to the control device that transmitted the parent request message. A parent response message may indicate that the device that transmits the parent response message is available to act as a parent device. Accordingly, a device that transmits a parent request message may receive a plurality of responses to the parent request message and determine a parent to attach to and/or synchronize with based on the received parent response messages. The device transmitting the parent request message may identify the received communication quality metric (e.g., RSSI) associated with the response messages and attempt attachment to the parent device having the largest received signal strength indicator for the response message.

In a network such as the network 200 shown in FIG. 2A, communication with sleepy-end devices may not be efficient. For example, communication with the sleepy-end device 250 may be performed such that the finite power source (e.g., the battery) of the sleepy-end device 250 is preserved. The sleepy-end device 250 may be configured with sleep cycles having periodic wake periods (e.g., during a wake state of the sleepy-end device 250) and sleep periods (e.g., during a sleep state of the sleepy-end device 250). The sleep periods may be predefined periods of time during which the sleepy-end device 250 may periodically disable its communication circuit to conserve the finite power source in the sleep state. The wake periods may be predefined periods of time during which the sleepy-end device 250 may be awake and in the wake state (e.g., after a sleep period, an actuation of a button on the device, or other triggering event for waking up). The sleepy-end device 250 may be configured to receive messages (e.g., unicast messages) from the associated router device 220a (e.g., a parent device to which the sleepy-end device is attached). When the router device 220a is unsynchronized with the sleepy-end device 250, the router device 220a may have difficulty determining the time (e.g., the wake period) at which the sleepy-end device 250 is awake for receiving messages transmitted by the router device 220a during the sleep cycle of the sleepy-end device 250.

In order to increase the chance that the sleepy-end device 250 receives a message from the router device 220a, the router device 220a may continue to repeatedly transmit a particular message (e.g., a unicast message) for a period of time that overlaps with the periods of time at which the sleepy-end device 250 may wake up to hear the message (e.g., wake periods of the sleep cycle of the sleepy-end device 250). For example, the sleepy-end device 250 may be preconfigured with a sleep cycle having a length of approximately 100 milliseconds during which the sleepy-end device 250 may enter the wake state to wake up to listen for messages on the network 200 during the wake period (e.g., approximately 5 milliseconds). The router device 220a may continue to repeatedly transmit messages and occupy the network with transmissions for the entire sleep cycle of the sleepy-end device 250, or a portion of the sleep period and the entire wake period, to increase the chances that the sleepy-end device 250 wakes up and receives the message. As the router device 220a may communicate with other end devices, the transmission of the messages to the sleepy-end device 250 at a time when the sleepy-end device 250 is unable to receive the messages may unduly interfere with and/or prevent receipt of communications between other devices in the network 200.

To improve the communication with sleepy-end devices (e.g., or other power-conservative devices), as well as other devices in the network that may be affected by inefficient communication with sleepy-end devices (e.g., or other power-conservative devices), the parent devices that are attempting to communicate with sleepy-end devices may schedule (e.g., synchronize) communications with the sleepy-end devices. One form of scheduled communications on a network may be a coordinated sampled listening (CSL) technique, for example. Using the coordinated sampled listening technique, a router device 220a (e.g., a parent device) may send a stream of wake-up messages to the sleepy-end device 250 prior to transmission of an actual message or payload message, which may include control instructions for a controlling a load control device or other instructions to which the sleepy-end device may be responsive. Each wake-up message may include the time when the transmission of the actual message, or payload message, will begin. These wake-up messages may enable the sleepy-end device 250 to receive a wake-up message during a sampling period (e.g., at low duty cycles) and synchronize its wake-up time with the transmission of the actual message, or payload message, from the router device 220a. The sleepy-end device 250 may receive the wake-up message and stay awake until the transmission of the actual message or payload message is about to begin. In addition, the sleepy-end device 250 may receive the wake-up message and return to sleep until the transmission of the actual message or payload message is about to begin.

Using the coordinated sampled listening technique, the router device 220a may schedule the time at which the transmission of the actual message or payload message to the sleepy-end device 250 occurs, such that the message may be transmitted as a unicast message directly to the sleepy-end device 250 during the wake period of the sleepy-end device 250. To reduce latency in responding to communications, the router device 220a may schedule the wake period during each sleep cycle of the sleepy-end device 250. For example, as described herein, the sleepy-end device 250 may be preconfigured with a sleep cycle of 100 milliseconds during which the sleepy-end device 250 may be awake for the wake period to receive messages from the router device 220a in the network 200. As such, the sleepy-end device 250 that is implementing the coordinated sampled listening technique to synchronize communications with the router device 220a may have a finite number of listening opportunities during a sleep cycle (e.g., one listening opportunity per sleep cycle) to reduce power usage without causing noticeable latency in responding to messages. Each router device 220a-220d may be configured with communication cycles having time periods (e.g., slots and/or phases) during which the router device may transmit respective unicast messages directly to each of the sleepy-end devices attached to the router device. For example, as shown in FIG. 2B, the router device 220d may be configured with a communication cycle having a first slot for communicating with the sleepy-end device 250b and a second slot for communicating with the sleepy-end device 250c. The communication cycle of each router device 220a-220d and the sleep cycles of each of the sleepy-end devices attached to each router device may start at different times. For example, a respective device phase may exist between the beginning of the communication cycle of one of the router devices 220a-220d and the beginning of the sleep cycles of the respective sleepy-end devices.

As the number of sleepy-end devices and/or router devices in the network increases, the ability to communicate messages to sleepy-end devices using the coordinated sampled listening technique may become more difficult. For example, as shown in FIG. 2B, a network 200a may include multiple router devices 220a, 220d that are communicating with sleepy-end devices 250a-250c. The sleepy-end device 250a may be attached to the router device 220a for receiving messages. The sleepy-end devices 250b, 250c may each be attached to the router device 220d for receiving messages. The router device 220a may schedule communications with the sleepy-end device 250a, such that the sleepy-end device 250a is able to wake up and receive messages during the wake period of each sleep cycle of the sleepy-end device 250a. The router device 220d may also schedule communications with the sleepy-end devices 250b, 250c, such that the sleepy-end device 250b and the sleepy-end device 250c are each able to wake up and receive messages during their respective wake periods of their sleep cycles. However, each router device 220a, 220d may be unaware of the communication cycle on which the other router device is communicating messages to the sleepy-end devices to which the other router device is attached (e.g., the communication cycle of the other router device). As a result, messages may be communicated from the router device 220a to the sleepy-end device 250a at the same time as messages being communicated from the router device 220d to one of the sleepy-end devices 250b, 250c. Thus, even when communications between the router devices 220a, 220d and the sleepy-end devices 250a-250c are scheduled, message collisions and interference may occur. As more sleepy-end devices are added to the network 200a, the chance of message collisions and interference increases.

Additionally, as the number of sleepy-end devices in the network 200a increases, and/or the number of messages being communicated to each sleepy-end device during a communication cycle of one of the router devices increases, the available slots for communicating with other sleepy-end devices during the communication cycle of each of the router devices 220a-220d decreases. For example, if the communication cycle of each router device 220a-220d in a network is 100 milliseconds long and each sleepy-end device wakes up for a wake period of 5 milliseconds to receive a message, the router devices within communication range of one another may be limited to communicating one message to 20 sleepy-end devices in a space during a given communication cycle. Additional time slots may be added for communicating additional messages to the sleepy-end devices 250a-250c by lengthening the communication cycle of the router devices 220a-220d in the network 200a, but this adds latency to the communications in the network.

Any delay in communications (e.g., caused by interference or lengthening the communication cycle of the router devices) may cause undue latency on the network and undesirable results in controlling electrical loads in the load control system. In controlling electrical loads (e.g., lighting loads, motorized window treatments, and/or other electrical loads) in a load control system, it may be desirable to control the electrical loads uniformly (e.g., synchronously and/or in unison). For example, multiple motorized window treatments may be controlled uniformly to allow for the covering material of each motorized window treatment to be raised or lowered uniformly. Multiple lighting loads may be dimmed or turned off/on uniformly. Any delay in the network may cause these electrical loads to be controlled out of sync and provide an undesirable user experience.

Embodiments are described herein for communicating with sleepy-end devices in a network (e.g., network 200a) using a coordinated multicast technique. However, although techniques are described herein using multicast messages, a person having ordinary skill in the art would understand that other types of messages may also be used (e.g., broadcast messages, unicast messages). Using the coordinated multicast technique, a router device, such as the router device 220d, may transmit coordinated multicast messages to sleepy-end devices, such as the sleepy-end devices 250b, 250c, which may allow the router device to communicate in a single time slot with multiple sleepy-end devices that are each awake at the same time. Additionally, the use of coordinated multicast messages may allow for a sleepy-end device, such as the sleepy-end device 250a, to receive messages from an auxiliary parent device, such as the router device 220d, to which the sleepy-end device is unattached but is capable of receiving messages during wake periods.

In implementing the coordinated multicast technique, a router device may transmit multicast messages to sleepy-end devices during a certain multicast slot of a communication cycle. Each communication cycle of the router device may be characterized by multiple multicast slots. Each multicast slot may further be characterized by a multicast phase, which may define the time at which a given multicast slot begins during the communication cycle. The multicast phase may be the time between the beginning of a communication cycle of a router device and/or a sleep cycle of a sleepy-end device, and the beginning of the multicast slot. The communication cycle may include periodic multicast slots for communicating messages from the router device. In certain scenarios, however, a router device may transmit messages to sleepy devices outside of its assigned multicast slot (e.g., unscheduled transmissions). The use of these unscheduled transmissions may be used to decrease latency of communications (e.g. decrease the time to deliver messages) to devices communicating over the network.

Each sleepy-end device may operate according to periodic sleep cycles that may include a wake period $T_{WAKE}$ and a sleep period $T_{SLEEP}$. The sleepy-end devices may be configured to periodically transition their respective communication circuits on during the wake period $T_{WAKE}$ and off during the sleep period $T_{SLEEP}$ based on the configured multicast slot and phase. The router devices may transmit wake up messages during the wake period $T_{WAKE}$ to indicate to the sleepy-end devices when the sleepy-end devices should wake up to receive messages in the multicast slot. The wake up messages may be shorter and sent more frequently to indicate to a device that it should stay awake to receive a primary or payload message, which may be longer than the wakeup messages. The router device may transmit a multicast message in the multicast slot and the multicast messages may be received by the sleepy-end devices that turn on their communication circuits to receive the multicast message in the multicast slot.

The router devices may each have a different communication schedule for communicating with different devices (e.g., different devices attached to the respective router device). For example, the communication schedule for communicating with a given device may be included in configuration data sent to the device for configuring communications. The communication schedule may include the communication cycles (e.g., different multicast slots and/or multicast phases) for one or more devices. A different communication schedule may be defined for different device types. For example, a router device may communicate with motorized window treatments using a different multicast slot and phase than may be implemented for communicating with other devices, such as lighting control devices. The router devices may otherwise group sleepy-end devices or other power-conservative devices into multicast slots. For example, a router device may categorize motorized window treatments that are children for the router device and are to be controlled together into the same multicast slot (e.g., one multicast slot each sleep cycle). The router device may use group numbers or another unique identifier that corresponds to a different multicast slot in the same sleep cycle to send different commands to different groups of motorized window treatments or different groups of other devices.

Each router device may configure its multicast slots so that the multicast slots do not overlap with multicast slots of other router devices and store the configuration in configuration data. For example, the router device 220a may be assigned a multicast slot and the router device 220b may be assigned another multicast slot (e.g., the multicast slot of the router device 220a occurs during a different period of time than the multicast slot of the router device 220b). The multicast slot may define a period of time (e.g., during each sleep period) during which a sleepy-end device may wake up to receive a multicast message. The multicast slot may be identified by a start time and/or an end time. For example, a communication schedule that defines the communication cycle of a router device may identify a start time and an end time to the multicast slot, or just a start time and the end time may be preconfigured (e.g., approximately 5 milliseconds after the start time). For example, the communication schedule may identify one or more multicast slots during the communication cycle of the router device. A sleepy-end device that receives a multicast message at one of the identified multicast slots may go to back to sleep without waiting for any repeat multicast messages that may be sent during the multicast slot. This may allow the sleepy-end devices to conserve additional battery life.

A different communication schedule may be used by each of the router devices 220a, 220d to transmit multicast messages to the sleepy-end devices for which it is a parent device. The communication schedule of each router device 220a, 220d may be shared in configuration data with the other router devices 220a, 220d, for example, by sending the communication schedule in a message (e.g., a multicast message) that may be received by the other router device 220a, 220d. This may allow the router devices to coordinate the communication schedules so as not to interfere with the multicast transmissions of another router device. The sleepy-end devices may be configured with the multicast slot when each sleepy-end device establishes its respective parent-child relationship. The communication schedule may also, or alternatively, be scheduled by the leader device 210 and communicated to the router devices and sleepy-end devices in the network 200a.

The sleepy-end devices 250a, 250b, 250c may go to sleep and/or wake up based on the communication cycles of their respective parent devices. For example, the sleepy-end devices 250a, 250b may receive configuration data that includes the configuration schedules and wake up during their respective multicast slot identified in the communication schedules that define the communication cycles of the router devices 220a, 220b. The sleepy-end device 250c may sleep for periods of time and may wake up during the multicast slots established by the router device 220d.

The sleepy-end devices 250a, 250b, 250c that are configured to communicate with their respective parent devices in multicast slots may also be configured to communicate with auxiliary parent devices. The auxiliary parent devices for sleepy-end devices may be other router devices located near a respective sleepy-end device that have multicast slots that occur at times other than the multicast slot of the respective sleepy-end device. The sleepy-end devices may be configured with additional multicast slots configured according to the communication schedule that defines the communication cycle of the auxiliary parent devices. This may allow the sleepy-end devices to communicate more efficiently on the network, as communications may occur with multiple sleepy-end devices during the same multicast slots and/or multiple multicast slots during a communication cycle of a router device, which may enable the sleepy-end device to then receive other communications and/or go back to sleep. The auxiliary parent devices for the sleepy-end devices may allow the sleepy-end devices to uniformly respond to messages. For example, multicast messages may be sent in response to a triggering event other than a scheduled transmission. A multicast message may be sent from the router device 220a (e.g., a remote control device, a mobile device, etc.) in response to a user actuation. The router device 220a may schedule the sleepy-end devices 250a, 250b to wake up (e.g., transition their respective communication circuits on) to receive messages in a multicast slot, which may enable each of the sleepy-end devices 250a, 250b to process multicast messages and respond to the multicast message uniformly or substantially uniformly, even when the multicast messages are transmitted asynchronously.

The router devices 220a, 220d may configure the auxiliary parent devices of their respective child devices. For example, as shown in FIG. 2B, the router device 220a may be configured to transmit multicast messages to the sleepy-end device 250a in a first multicast slot, and the router device 220d may be configured to transmit multicast messages to the sleepy-end devices 250b, 250c in a second multicast slot. The router devices 220a, 220d may be configured to coordinate with each other when establishing the start times of multicast slots (e.g., as defined by the multicast phases), such that the first multicast slot during which the router device 220a may transmit multicast messages may not overlap with the second multicast slot during which the router device 220d may transmit multicast messages. The router device 220a may be configured to establish the router device 220d as an auxiliary router of the sleepy-end device 250a (e.g., its child device). The sleepy-end device 250a may then be configured to receive multicast messages from the router device 220d during the second multicast slot (e.g., during which the router device 220d was already configured to transmit multicast messages to the sleepy-end devices

250b, 250c). Similarly, the router device 220d may be configured to establish the router device 220a as an auxiliary router of the sleepy-end device 250b (e.g., its child device). The sleepy-end device 250b may then be configured to receive multicast messages from the router device 220a during the first multicast slot (e.g., during which the router device 220a was already configured to transmit multicast messages to the sleepy-end device 250a).

Referring now to the load control system 100 of FIG. 1A, the motorized window treatments 150 may be examples of sleepy-end devices configured to uniformly respond to messages (e.g., command messages). For example, the motorized window treatments 150 may be configured to uniformly respond to commands to adjust the position of the respective window treatment fabrics 152. If the commands are not uniformly responded to, the position of each of the respective window treatment fabrics may not be uniform (e.g., one of the window treatment fabrics may not correspond to the position intended by the occupant 192). In order to uniformly respond to command messages, the motorized window treatments 150 may receive the command messages simultaneously or substantially simultaneously. However, if messages are transmitted as unicast messages to each of the respective motorized window treatments 150, the message may not be received simultaneously or substantially simultaneously (e.g., due to a failure to schedule the unicast messages during the same or substantially the same time).

FIGS. 3A-6 are timing diagrams illustrating exemplary message transmissions between a router device and one or more sleepy-end devices configured to communicate with the router device. As described herein, the one or more power-conservative control devices, such as sleepy-end devices. For example, the one or more sleepy-end devices (e.g., sleepy-end devices) may be powered by a finite power source (e.g., a battery). In addition, the one or more sleepy-end devices may be configured to be uniformly controlled together (e.g., motorized window treatments controlling a covering material, lighting control devices controlling lighting loads, or any other control device configured for uniform control).

Figure 3A:
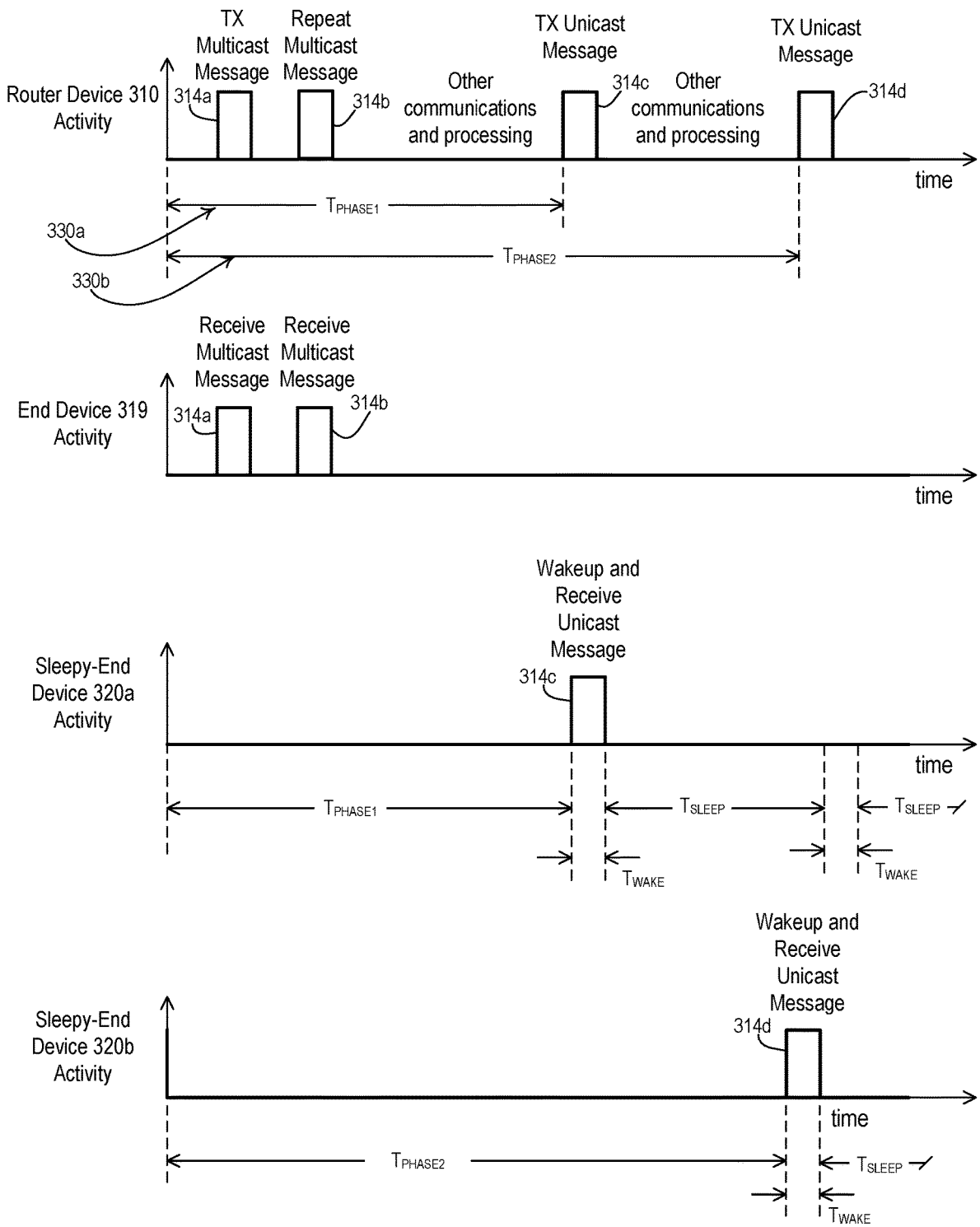
FIG. 3A is a timing diagram illustrating an example of messages transmissions in message slots.

FIG. 3A is a timing diagram illustrating exemplary message slots for enabling transmission of messages between control devices in a network (e.g., the networks 200, 200a). As illustrated in FIG. 3A, a router device 310 may communicate with end device 319 and sleep-end devices 320a, 320b by transmitting messages (e.g., multicast messages, unicast message, and/or broadcast messages) during message slots 314a, 314b, 314c, 314d.

As shown in FIG. 3A, the router device 310 may transmit a multicast message during the message slot 314a. In addition, the router device 310 may transmit a repeat of the message transmitted during the message slot 314a during the message slot 314b. The end device 319 may then receive the messages transmitted during the multicast slots 314a, 314b.

As described herein, sleepy-end devices 320a, 320b may be configured to transition between a sleep state and a wake state. When the sleepy-end devices 320a, 320b enter the wake state, the sleepy-end devices wake up for the wake period $T_{WAKE}$, for example, to receive the messages during a given message slot. The sleepy-end devices may then transition to the sleep state for the sleep period $T_{SLEEP}$. In order to communicate with sleepy-end devices 320a, 320b such that message are transmitted to the sleep-end devices 320a, 320b while they are in the wake state, the router device 310 may implement a communication schedule. The communication schedule may be respectively defined by the sleepy-end devices 320a, 320b. As shown, the communication cycle of the sleepy-end devices 320a, 320b may each be associated with a respective phase. For example, sleepy-end device 320a may be associated with $T_{PHASE1}$ 330a, and sleepy-end device 320b may be associated with $T_{PHASE2}$ 330b.

Each of the sleepy-end devices 320a, 320b may transmit an indication of timing for their respective sleep and wake states to the router device 310. Based on this indication and their respective wake and sleep schedules, the router device 310 may communicate with the sleepy-end devices 320a, 320b. For example, the router device may transmit a unicast message to the sleepy-end device 320a during the message slot 314c, and a unicast message to the sleepy-end device 320b during the message slot 314d. As these messages are transmitted according to the communication schedule defined the by the sleepy-end device 320a, sleep-end device 320a may then wake up and receive the unicast message during the message slot 314c. Similarly, the sleepy-end device 320b may wake up and receive the unicast message during the message slot 314d.

As described, the sleepy-end devices 320a, 320b may be configured to transmit an indication of their respective awake and sleep schedules to the router device 310. In response, the router device 310 may, based on their awake and sleep schedules, communicate with the sleepy-end devices 230a, 320b. However, as the number of sleepy-end devices and/or router devices in the network increases, the ability to communicate messages to sleepy-end devices using the technique illustrated in FIG. 3A may become more difficult. For example, while the router device 310 may be aware of the times during which the sleepy-end devices 320a, 320b are awake and capable of receiving messages, other router devices may be unaware of the awake and/or sleep schedules of these sleepy-end devices. As a result, messages may be communicated from the other router device to the sleepy-end device 320a, 320b while they are in a sleep state and not able to receive the messages. In addition, the likelihood of message collisions may increase in this scenario. And as more sleepy-end devices are added to the network, the chance of message failures, collisions, and/or interference increases.

In certain scenarios, one or more sleepy-end devices may be configured, for example, by the router device, to use the coordinated multicast technique. For example, and as described herein, the coordinated multicast technique may be implemented by using a communication schedule. The sleepy-end device may be configured with a multicast slot and a multicast phase that are defined in the communication schedule of the router device. As illustrated in FIGS. 3B-6, the multicast slots may occur periodically, for example, once during each sleep cycle of the sleepy-end devices. In addition, the one or more sleepy-end device may be configured to periodically transition their respective communication circuits on (e.g., during a wake period $T_{WAKE}$) and off (e.g., during a sleep period $T_{SLEEP}$) based on the configured multicast slot and phase.

Figure 3B:
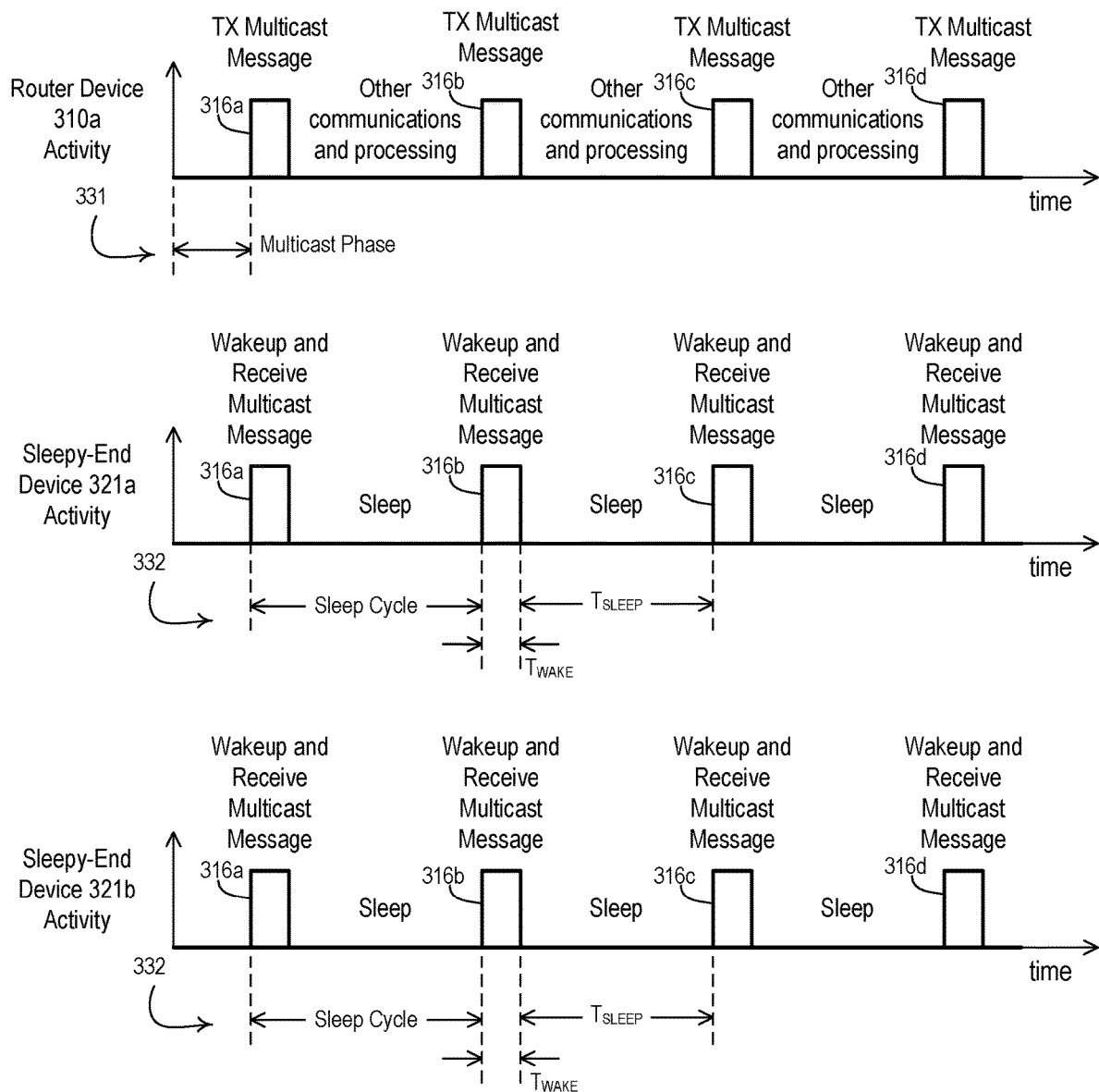
FIG. 3B is a timing diagram illustrating an example of multicast message transmissions in multicast slots.

FIG. 3B is a timing diagram illustrating exemplary multicast slots for enabling transmission of multicast messages between devices in a network (e.g., the networks 200, 200a). As illustrated in FIG. 3B, a router device 310a may communicate on a communication cycle, where each communication cycle may include one of a number of periodic multicast slots 316a, 316b, 316c, 316d. Each communication cycle may include a multicast phase 331 that defines the time between the beginning of a communication cycle of a router and the beginning of the multicast slot 316a. The router device 310a may implement the coordinated multicast technique by transmitting multicast messages during the multicast slots 316a, 316b, 316c, 316d. As illustrated in FIG. 3B, the multicast slots 316a, 316b, 316c, 316d may occur periodically, during the communication cycles of the router device 310a. The multicast slots 316a, 316b, 316c, 316d may be offset by the multicast phase from a beginning of each communication cycle. The multicast phase and/or multicast slots 316a, 316b, 316c, 316d may be defined in the communication schedule.

The router device 310a and/or the sleepy-end devices 321a, 321b may be configured with a respective multicast phase that may define when the multicast slot 316a starts in the sleep cycle 332 of each sleepy-end device (e.g., corresponding with when the multicast slot 316a starts in the communication cycle of the router device 310a). The multicast slot 316a may include a time period during which a first message may be transmitted that includes a command from the router device 310a. The other multicast slots 316b, 316c, 316d may include repeated messages that include the same command in the multicast message transmitted during the multicast slot 316a or other commands from the router device 310a.

The sleepy-end devices 321a, 321b may be coordinated in the times at which the sleepy-end devices 321a, 321b enters the wake state. When the sleepy-end devices 321a, 321b enter the wake state, the sleepy-end devices wake up for the wake period $T_{WAKE}$ during each sleep cycle 332 to receive the multicast messages transmitted during multicast slots 316a, 316b, 316c, 316d using the coordinated multicast technique. The multicast slots 316a, 316b, 316c, 316d may be based on the communication schedule of the router device 310a. For example, sleepy-end devices 321a, 321b may wake in multicast slot 316a (e.g., 5 milliseconds out of 100 millisecond period of time) that may occur at approximately the same time as defined by the respective multicast phases.

The sleepy-end devices 321a, 321b may be configured to uniformly respond to multicast messages received from the router device 310a. The sleepy-end devices 321a, 321b may receive multicast messages transmitted during multicast slots 316a, 316b, 316c, 316d and respond uniformly to a command in the received messages. For example, motorized window treatments may adjust a covering material by the same amount at the same time in response to receipt of a multicast message received in one or more of the multicast slots 316a, 316b, 316c, 316d.

As described herein, the router device 310a may configure the sleepy-end devices 321a, 321b with the multicast slot and the multicast phase. In response, the sleepy-end devices 321a, 321b may determine that coordinated multicast messages may be received from the router device 310a during the multicast slots 316a, 316b, 316c, 316d. In addition, the sleepy-end devices 321a, 321b may periodically transition their respective communication circuits on (e.g., wake up), such that the sleepy-end devices 321a, 321b may listen for multicast messages during the multicast slots 316a, 316b, 316c, 316d.

The commands that are transmitted during multicast slots 316a, 316b, 316c, 316d may be generated periodically or in response to a user interaction or user input at an input device (e.g., the remote control device 170 shown in FIG. 1A). As described herein, the user interactions or inputs may occur asynchronously (e.g., such that the input device is unlikely to predict when user interactions or inputs will occur). However, as the multicast slots 316a, 316b, 316c, 316d occur periodically, the router device 310a may include commands generated in response to asynchronous user interaction and then sent in messages during the periodic the multicast slots 316a, 316b, 316c, 316d. Further, as the sleepy-end devices 321a, 321b are configured to wake up their respective receivers during the multicast slots 316a, 316b, 316c, 316d, the sleepy-end devices 321a, 321b may receive commands that are generated asynchronously and respond at the same or substantially the same time.

The router device 310a may perform other communications and processing in between each of the multicast slots 316a, 316b, 316c, 316d. For example, the router device 310a may schedule and transmit messages to other end devices, sleepy-end devices, and/or router devices in between successive multicast slots. The sleepy-end devices 321a, 321b may transition their respective communication circuits off (e.g., go to sleep) for the sleep period $T_{SLEEP}$ in between each of the multicast slots 316a, 316b, 316c, 316d, which may conserve the finite power source of each of the sleepy-end devices 321a, 321b.

Figure 4:
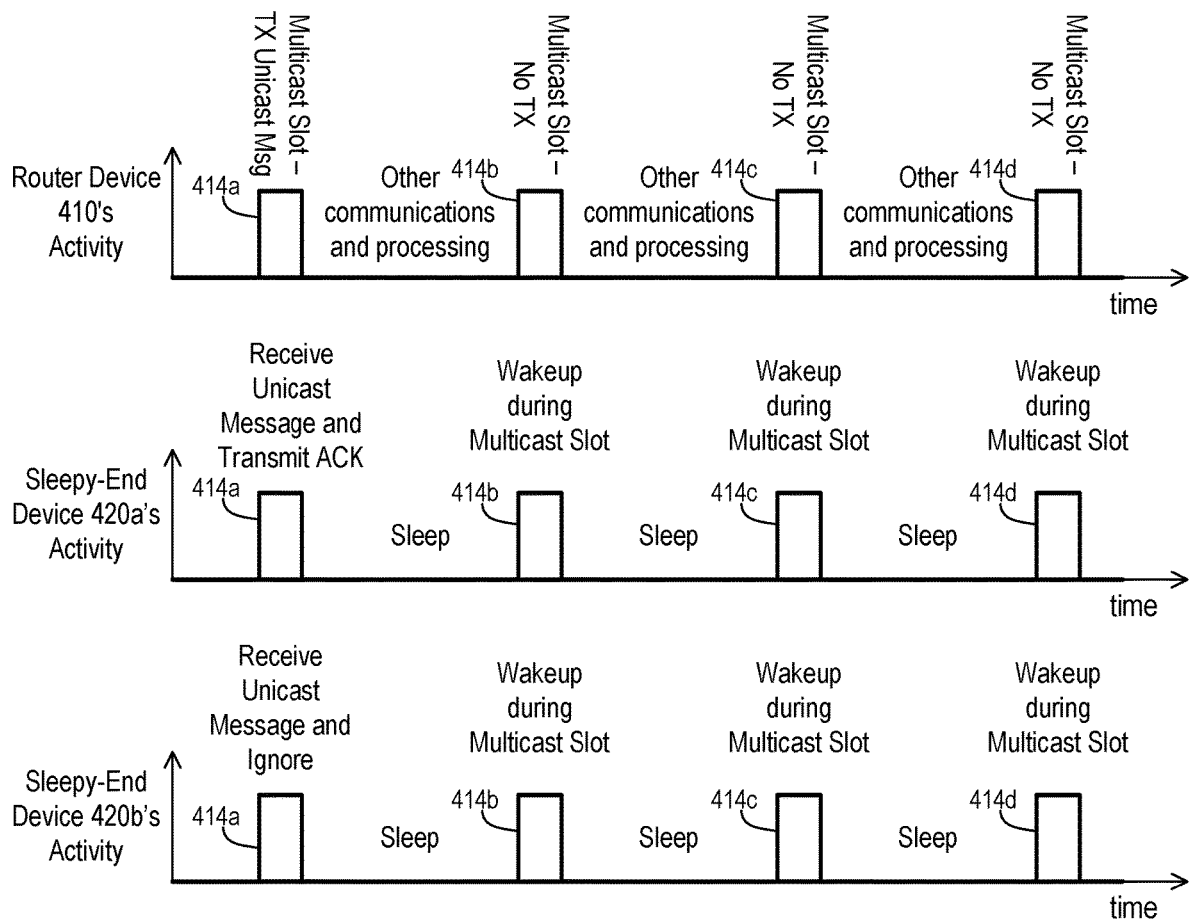
FIG. 4 is a timing diagram illustrating an example of unicast message transmissions in multicast slots.

The multicast slots that are being reserved for coordinated multicast transmissions may also be used to transmit unicast messages, for example, when the multicast slots are not being used to transmit multicast messages. FIG. 4 is a timing diagram illustrating exemplary unicast message transmissions in multicast slots. As illustrated in FIG. 4, a router device 410 may implement the coordinated multicast technique using a communication schedule. For example, the router device 410 may be configured to transmit multicast messages in multicast slots 414a, 414b, 414c, 414d. The router device 410 may transmit multicast messages or unicast messages during the multicast slots 414a, 414b, 414c, 414d. For example, the router device 410 may transmit a unicast message 412 in the multicast slot 414a. For example, though the multicast slots 414a, 414b, 414c, 414d may be reserved for multicast messages in a communication schedule, the router device 410 may identify that a multicast slot 414a, 414b, 414c, 414d may be reserved for a multicast message, but the router device 410 may not have a multicast message to be transmitted during the multicast slot 414a, 414b, 414c, 414d, so the multicast slot 414a, 414b, 414c, 414d may be used for a unicast message. Additional battery life may be preserved by communicating directly with the sleepy-end device using unicast messages in multicast slots and not causing the sleepy-end device to wake up for a separate unicast slot to additionally receive the unicast messages. The unicast message 412 in the multicast slot 414a may include the unique identifier of the recipient. Control devices that have another unique identifier than the unique identifier in the unicast message 412 may determine that the unicast message 412 is not intended for the control device and the control device may go back to sleep. Firmware upgrades for individual sleepy-end devices may also be sent via unicast messages, so as to allow the other sleepy-end devices to remain asleep when communicating a firmware upgrade to another sleepy-end device. The router device 410 may even transmit a command that causes the other sleepy-end devices that are not receiving a firmware upgrade to fall asleep. The control devices that receive the command may go to sleep for a period of time (e.g., predefined or indicated in the command) that is used for the firmware upgrade.

Referring again to FIG. 4, a unicast message intended for sleepy-end device 420a may be transmitted in the multicast slot 414a. Accordingly, the unicast message transmitted in the multicast slot 414a may include an indication (e.g., unique identifier or group identifier) that the intended recipient of the unicast message (e.g., the sleepy-end device 420a). As illustrated in FIG. 4, the router device 410 may transmit the unicast message intended for sleepy-end device 420a in the multicast slot 414a. The sleepy-end devices 420a, 420b may be configured to wake up during the multicast slots 414a, 414b, 414c, 414d and transition their respective communication circuits on to receive messages during the multicast slots 414a, 414b, 414c, 414d. Accordingly, the sleepy-end devices 420a, 420b may receive the unicast message transmitted in the multicast slot 414a. Each of the sleepy-end devices (e.g., the sleepy-end device 420b) may ignore unicast messages transmitted to another sleepy-end device (e.g., the sleepy-end device 420a) during the multicast slots 414a, 414b, 414c, 414d. When the sleepy-end device 420a is the intended recipient of the unicast message transmitted during the multicast slots 414a, 414b, 414c, 414d, the sleepy-end device 420a may transmit an acknowledgement message or a negative acknowledgement message, which may be implemented when transmitting unicast messages, during the respective multicast slot 414a, 414b, 414c, 414d. Acknowledgement messages and negative acknowledgement messages may not be implemented when transmitting multicast messages, as multicast messages may be transmitted multiple times.

As the unicast message transmitted during multicast slot 414a is intended for the sleepy-end device 420a, the sleepy-end device 420a may receive the unicast message and transmit an acknowledgment (ACK) message of the receipt of the unicast message to the router device 410. The sleepy-end device 420b may also receive the unicast message intended for the sleepy-end device 420a in the multicast slot 414a. However, as the unicast message is not intended for the sleepy-end device 420b, the sleepy-end device 420b may ignore the unicast message transmitted in the multicast slot 414a and may go back to sleep. Additionally, the sleepy-end device 420b may be unable to decode the unicast message transmitted during the multicast slot 414a and, as a result, may ignore the unicast message 412.

The router device 410 may not transmit unicast messages at the multicast slots 414b, 414c, 414d. The router device 410 may also, or alternatively, transmit a unicast message (e.g., the same unicast message or a different unicast message) in each multicast slot 414b, 414c, 414d. For example, if the unicast message includes a firmware upgrade, the router device 410 may transmit unicast messages with different data in each of the multicast slots 414b, 414c, 414d. In another example, if an acknowledgement message is not transmitted in response to the unicast message transmitted during multicast slot 414a, the unicast message may be transmitted again in the next multicast slot 414b. Though the sleepy-end device 420a received the unicast message 412 and transmitted an acknowledgement message, if the sleepy-end device 420a transmitted a negative acknowledgement message back that indicated that the unicast message failed to be received during the multicast slot 414a, the router device 410 may retransmit the unicast message in one or more of the additional multicast slots 414b, 414c, 414d.

These multicast slots 414b, 414c, 414d may be reserved for repeat multicast messages. As the router device 410 transmitted a unicast message in the multicast slot 414a, the other multicast slots 414b, 414c, 414d may fail to be utilized by the router device 410. The sleepy-end devices 420a, 420b may identify the unicast message and determine that the multicast slots 414b, 414c, 414d may not be utilized by the router device 410 and may go to sleep. As the sleepy-end devices 420a, 420b may receive messages from other auxiliary parents, the multicast slots 414b, 414c, 414d may be utilized by other auxiliary parent devices for communicating messages. For example, another auxiliary parent may identify the unicast message being transmitted on the multicast slot 414a and/or the acknowledgement message transmitted back to the router device 410 and decide to utilize one or more of the multicast slots 414b, 414c, 414d for its own transmissions.

Figure 5:
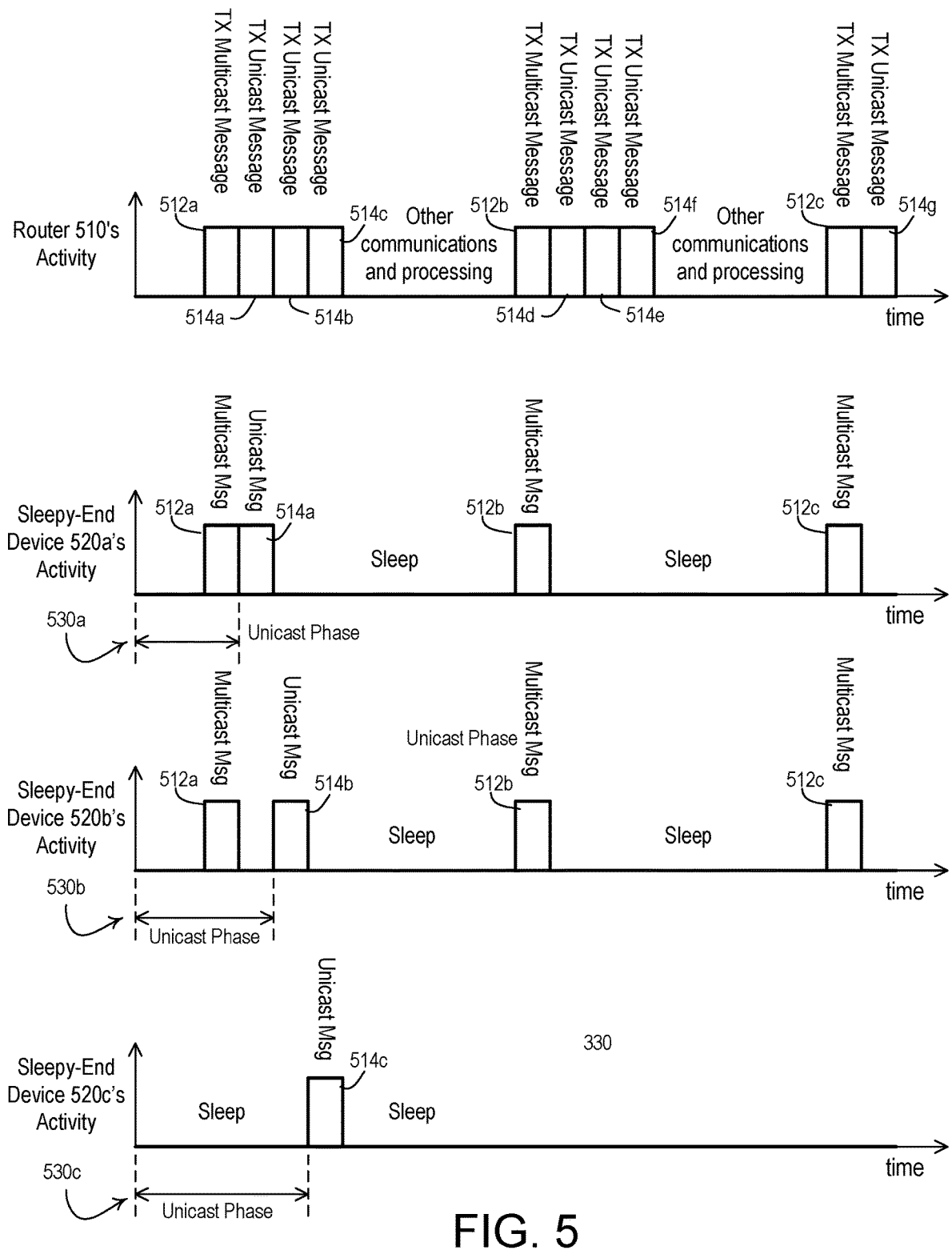
FIG. 5 is a timing diagram illustrating an example of unicast message transmissions in unicast slots.

While FIG. 4 shows transmission of a unicast message in a multicast slot, the communication schedules may define multicast slots as well as unicast slots separately for communicating on the network. FIG. 5 is a timing diagram illustrating an exemplary configuration of multicast slots and unicast slots. As illustrated in FIG. 5, multicasts slots 512a, 512b, 512c and unicast slots 514a, 514b, 514c, 514d, 514e, 514f, 514g may be available to a router device 510 for transmission. For example, the router device 510 may schedule transmission of messages to sleepy-end devices 520a, 520b, 520c during the multicasts slots 512a, 512b, 512c and/or the unicast slots 514a, 514b, 514c, 514d, 514e, 514f, 514g. The router device 510 may transmit multicast messages intended for two of the sleepy-end devices 520a, 520b in the multicast slots 512a, 512b, 512c. The router device 510 may transmit unicast messages intended for one of the sleepy-end devices 520a, 520b, 520c in each of the unicast slots 514a, 514b, 514c, 514d, 514e, 514f, 514g. The sleepy-end devices 520a, 520b, 520c may ignore unicast messages transmitted during another device's unicast slot, or go back to sleep during the other device's unicast slot. For parent devices and/or child devices to communicate with a secure connection, such as a door lock or other device with which communication security may be important, and unicast messages may be transmitted during the additional unicast slots 514a, 514b, 514c, 514d, 514e, 514f, 514g (e.g., and not during one of the multicast slots 512a, 512b, 512c) to prevent other devices from receiving the unicast message (e.g., other control devices may not have keys for decrypting unicast message). For example, the router device 510 may transmit unicast messages intended for the sleepy-end device 520c in the unicast slot 514c. The multicast slots 512a, 512b, 512c may be offset by a multicast phase from a beginning of each communication cycle. The unicast slots 514a, 514b, 514c, 514d, 514e, 514f, 514g may be offset by a respective unicast phase from the beginning of one or more of the communication cycles. For example, the unicast slots 514a, 514b, 514c, 514d, 514e, 514f, 514g may not occur during each of the communication cycles, and may repeat on a less periodic basis that the multicast slots 512a, 512b, 512c (e.g., once every three communication cycles). The multicast slots 512a, 512b, 512c and/or the unicast slots 514a, 514b, 514c, 514d, 514e, 514f, 514g may be defined in the communication schedule.

In response to being configured with a respective multicast and/or unicast slot by the router device 510, the sleepy-end devices 520a, 520b, 520c may wake up their respective communication circuits (e.g., transition their respective communication circuits on) such that the sleepy-end devices 520a, 520b, 520c may receive messages during the configured multicast or unicast slots. As illustrated in FIG. 5, the router device 510 may configure the sleepy-end device 520a to receive messages during the multicast slots 512a, 512b, 512c and the unicast slot 514a. The unicast slot 514a may be offset by a unicast phase 530a from the beginning of a first communication cycle as shown in FIG. 5. Accordingly, the sleepy-end device 520a may wake up its communication circuit to receive multicast messages during the multicast slots 512a, 512b, 512c and unicast messages during the unicast slot 514a. In addition, the sleepy-end device 520a may transition its communication circuit to sleep (e.g., turn off) for the time in between the unicast slot 514a and the multicast slot 512b, and for the time in between the multicast slot 512b and the multicast slot 512c, which may conserve the power source of the sleepy-end device 520a.

The router device 510 may configure the sleepy-end device 520b to receive message during messages during the multicast slots 512a, 512b, 512c and the unicast slot 514b. The unicast slot 514b may be offset by a unicast phase 530b from the beginning of a first communication cycle as shown in FIG. 5. The sleepy-end device 520b may wake up its communication circuit to receive multicast messages during the multicast slots 512a, 512b, 512c and unicast messages during the unicast slot 514b. In addition, the sleepy-end device 520b may transition its communication circuit to sleep (e.g., turn off) for the time in between the unicast slot 514b and the multicast slot 512b, and for the time in between the multicast slot 512b and the multicast slot 512c, which may conserve the finite power source of sleepy-end device 520b. The sleepy-end device 520b may transition its communication circuit to sleep (e.g., turn off) for the time in between the multicast slot 512a and the unicast slot 514b, or determine that the period is shorter than a predefined period and stay awake. The router device 510 may configure the sleepy-end device 520c to receive unicast messages during the unicast slot 514c. The unicast slot 514c may be offset by a unicast phase 530c from the beginning of a first communication cycle as shown in FIG. 5. The sleepy-end device 520c may wake up its communication circuit to receive unicast messages during the unicast slot 514c. In addition, the sleepy-end device 520c may transition its communication circuit to sleep (e.g., turn off) for the time outside of the unicast slot 514c.

Figure 6:
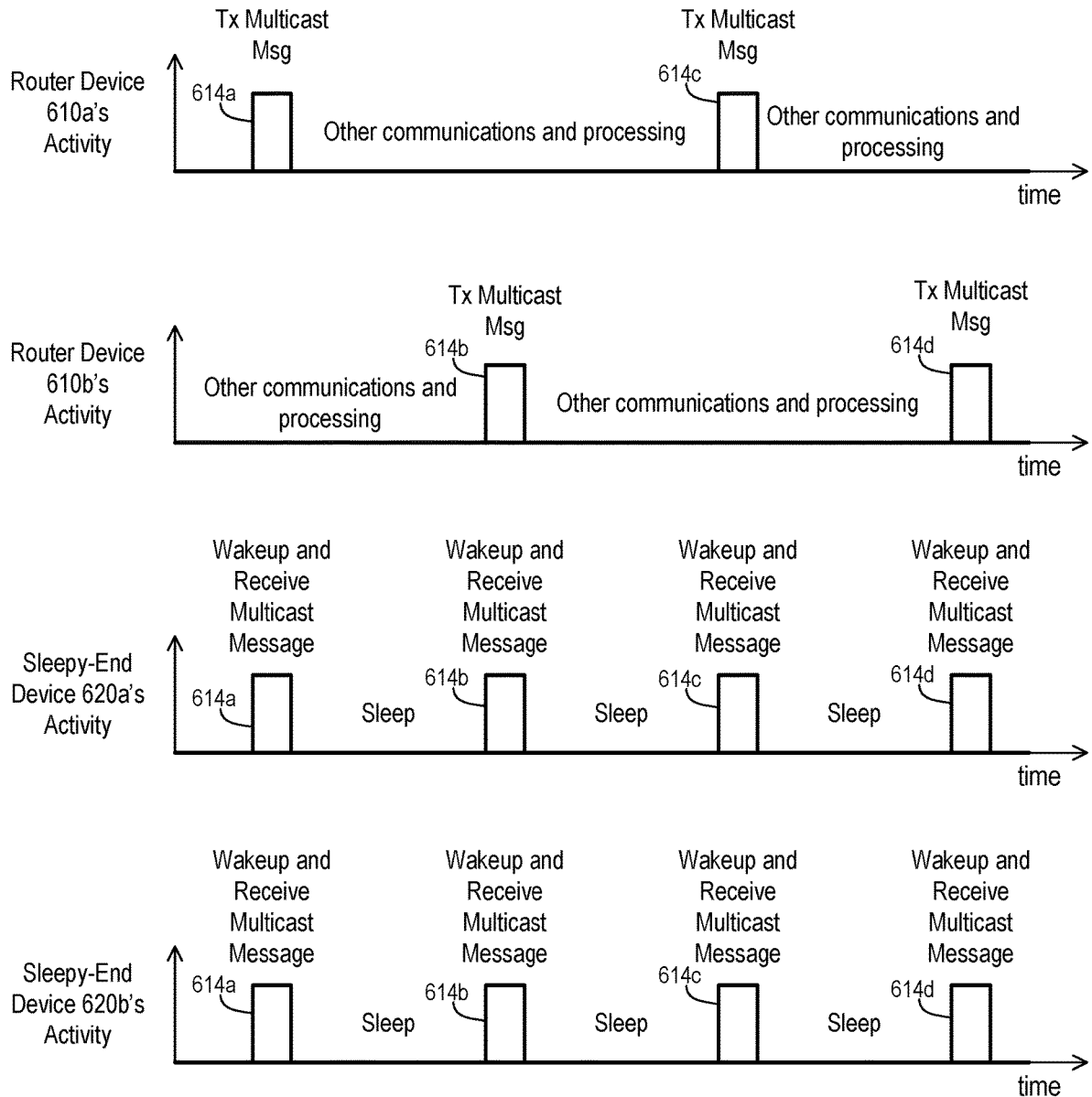
FIG. 6 is a timing diagram illustrating an example of multicast message transmissions from multiple router devices.

FIG. 6 is a timing diagram illustrating exemplary coordinated multicast message transmissions from multiple router devices (e.g., a parent device and one or more auxiliary parent devices). As illustrated in FIG. 6, each of the sleepy-end devices 620a, 620b may be configured to communicate with router devices 610a, 610b using coordinated multicast. For example, the first router device 610a may be a parent device of both of the sleepy-end devices 620a, 620b, and the second router device 610b may be an auxiliary parent device of both of the sleepy-end devices 620a, 620b. As such, the sleepy-end devices 620a, 620b may wake up during the multicast slots 614a, 614b, 614c, 614d indicated for receiving messages from each of the router devices 610a, 610b by their respective communication schedules. For example, the communication schedule of the router device 610 may indicate that the multicast slots 614a, 614c may be utilized by the router device 610a for transmitting coordinated multicast messages. Similarly, the communication schedule of the router device 610b may indicate that the multicast slots 614b, 614d may be utilized by the router device 610b for transmitting coordinated multicast messages. The sleepy-end devices 620a, 620b may be configured to turn on their respective communication circuits and receive messages from the router device 610a during the multicast slots 614a, 614c, and from the router device 610b during the multicast slots 614b, 614d. In addition, the sleepy-end devices 620a, 620b may be configured to turn off their respective communication circuits (e.g., go to sleep) outside of the multicast slots 614a, 614b, 614c, 614d of each of the router devices 610a, 610b.

In addition, the router device 610a may perform other communications and processing for a period of time in between the multicast slots 614a and 614c, and for a period of time after multicast slots 614c. The router device 610b may transmit the multicast messages 612b, 612d in the multicast slots 614b, 614d, respectively. The router device 610b may perform other communications and processing for a period of time prior to the multicast slot 612b and for a period of time in between the multicast slots 612b and 612d.

Figure 7:
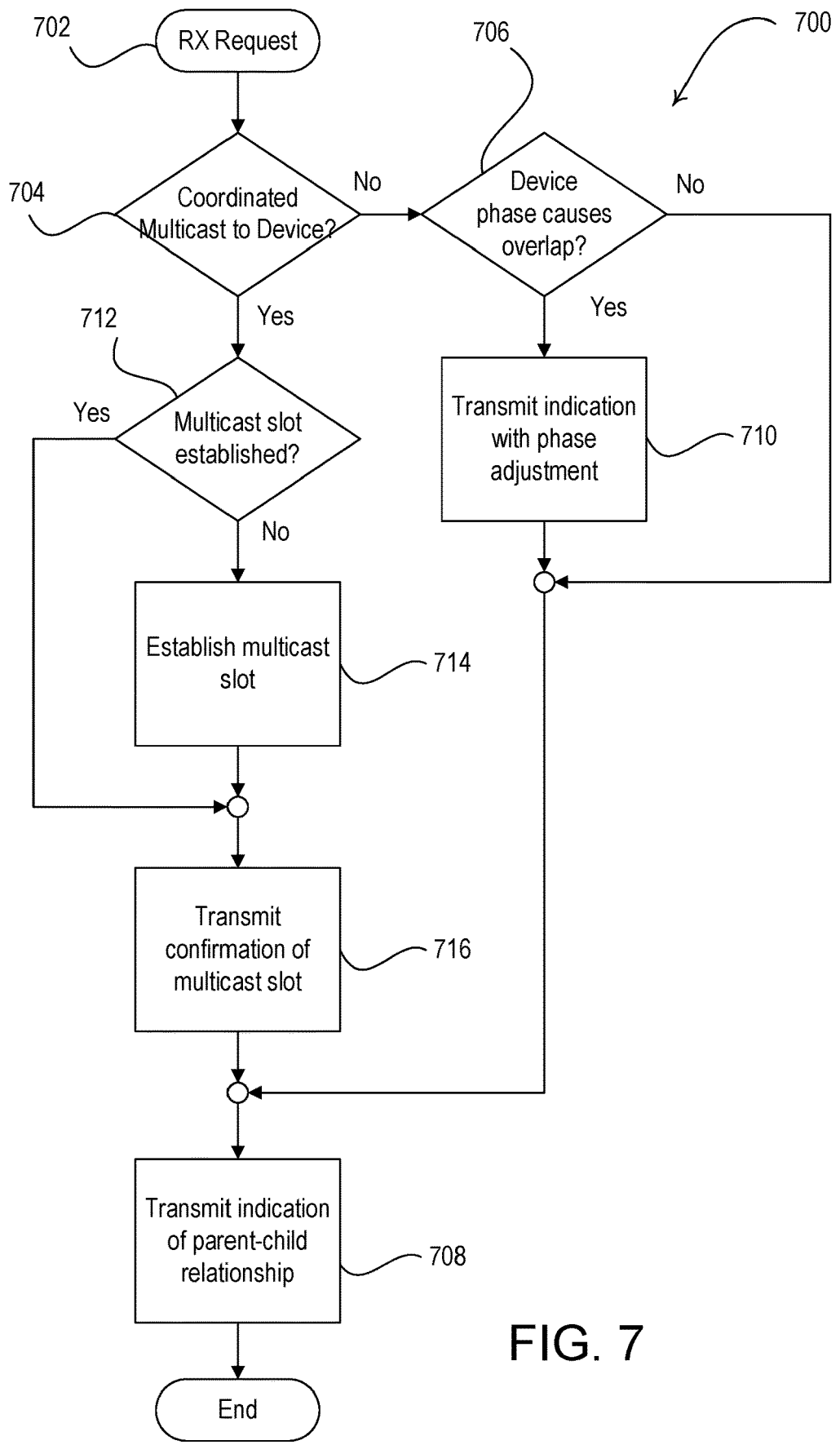
FIG. 7 is a flowchart of an exemplary procedure for the transmission of multicast messages in multicast slots.

The configuration of the multicast phase and/or multicast slots for coordinated multicast transmissions with each parent device (e.g., the communication schedule of each parent device) may be configured during establishment of the parent-child relationship. FIG. 7 is a flowchart of an exemplary procedure 700 for establishing a parent-child relationship between a parent device (e.g., a router device and/or leader device) and a child device (e.g., sleepy-end device). The procedure 700 may be performed by a control device that may be a potential parent device (e.g., a router device and/or a leader device). For example, the control device may execute the procedure 700 in response to receiving a parent request message from a potential child device (e.g., an end device that may become a child device of the potential parent device) at 702. The control device may be configured to transmit the parent request message, for example, when the control device is powered on and/or is attempting to attach to a network (e.g., the networks 200, 200a). For example, the control device may transmit the parent request message in an attempt to establish itself as a child device of the control device that receives the parent request message.

The parent request message may indicate the type of control device that transmitted the parent request message. For example, the parent request message may indicate that the control device is a sleepy-end device, end device, or router-eligible end device, respectively. The parent request message may also include information about the how control device may receive messages (e.g., the device phase of the sleep cycle of the control device with respect to the communication cycle of the router device). Referring to FIG. 2A, for example, the sleepy-end device 250 may transmit a parent request message to the router device 220a in an attempt attach to the network 200 and/or establish itself as a child device of the router device 220a.

Referring again to FIG. 7, at 704, the potential parent device may determine whether to use the coordinated multicast technique to transmit coordinated multicast messages to the control device from which the parent request message was received. The determination of whether to use the coordinated multicast technique to transmit coordinated multicast messages to the control device may be based on the type of control device that transmits the request. For example, as described herein, the coordinated multicast technique may be used to transmit coordinated multicast message to sleepy-end devices that are to be controlled in unison with other sleepy-end devices (e.g., the motorized window treatments 150 of the load control system 100 or other power-conservative control devices, such as battery powered lighting control devices, for example).

As described herein, the phase of the sleep cycle of the control device (e.g., the device phase) that transmitted the parent request message may be included in the parent request message received at 702. Accordingly, if the potential parent device determines not to use the coordinated multicast technique to transmit coordinated multicast messages to the control device that transmitted the parent request message at 702, the potential parent device may determine whether the phase of the sleep cycle of the control device causes overlap with other child devices of the potential parent device (e.g., unicast or multicast slots of other child devices of the potential parent device in the communication schedule of the potential parent device). For example, if the phase of the control device overlaps with the phase of another control device (e.g., a child device of the potential parent device), the control device and the other child device may transmit and/or receive messages at the same or substantially the same time, and the messages transmitted and/or received by the respective control devices may collide with one another and/or fail to be received. If, however, the phase of the sleep cycle of the control device does not cause overlap with the phase of another control device, a parent-child relationship may be established between the control device that transmitted the parent request message at 702 and the potential parent device performing the procedure 700 (e.g., the potential parent device may set a unicast phase for the control device equal to the initial device phase). The potential parent device may transmit a confirmation of the parent-child relationship to the control device that transmitted the parent request message at 708. If, however, the phase of the sleep cycle of the control device determines an overlap at 706 with the phase of another control device, the potential parent device may determine a phase adjustment, and an indication of the phase adjustment may be transmitted at 710 (e.g., the potential parent device may set a unicast phase for the control device equal to the initial device phase plus the phase adjustment). For example, the phase adjustment may be determined such that the phase of the sleep cycle of the control device no longer overlaps with the phase of the other control device (e.g. a child device of the parent device performing the procedure 700), which may decrease the likelihood of message collisions and/or failed communication. The potential parent device may transmit the confirmation of the parent-child relationship to the control-device at 708, such that the parent-child relationship may be established with the adjusted phase.

If the potential parent device determines to use the coordinated multicast technique to transmit coordinated multicast messages to the child device that transmitted the parent request message at 702, the potential parent device may determine, at 712, whether a multicast slot has been established for other control devices and may be used for the control device that transmitted the parent request message. For example, the potential parent device may determine whether a multicast slot has already been established for a group of control devices of which the control device is a member. If the potential parent device has already established the multicast slot for other sleepy-end devices that are to be controlled together (e.g., in a group of control devices), the potential parent devices may not have to establish that multicast slot again.

As described herein, the multicast slot may include or define the period of time during which coordinated multicast messages may be transmitted and/or received. If a multicast slot has not been established for the control device, the potential parent device may establish a multicast slot for the control device at 714. In addition, the coordinated multicast messages may include commands (e.g., commands to transition the intensity level of lighting devices or commands to adjust the shade position of a motorized window treatment), which may be configured to be executed simultaneously (e.g., substantially simultaneously) with other control devices. For example, a multicast slot and/or coordinated multicast transmissions may be established for certain sleepy-end devices that are configured for uniform control with other control devices (e.g., execute commands in uniformity with the other devices), such as motorized window treatments, lighting control devices, or other power-conservative control devices. The multicast slot may occur periodically, and may also be associated with a multicast phase. For example, the multicast phase may indicate the time at which the multicast slot begins. At 716, the parent device may transmit confirmation of the multicast slot to the device that transmitted the parent request message. The parent device may also transmit a confirmation of the parent-child relationship to the control device that transmitted the parent request message at 708 and the procedure 700 may exit.

The sleepy-end devices configured with a multicast slot may periodically transition their respective communication circuits between an on state (e.g., wakeup) and an off state (e.g., sleep) based on the established multicast slot. For example, when the communication circuit wakes up or is in the on state, the sleepy-end devices may be able to receive and/or transmit messages. When the communication circuit is asleep or is in the off state, the sleepy-end devices may be unable to receive and/or transmit messages, which may conserve the sleepy-end devices finite power source. The sleepy-end devices may periodically wake up the communication circuit during the configured multicast slot so that the sleepy-end devices are able to receive coordinated multicast transmissions. Similarly, the sleepy-end device may periodically transition the communication circuit to sleep in between successive multicast slots. In addition, consumption of the sleepy-end device's finite power source may be higher when the communication circuit is awake than when the communication circuit is asleep. Accordingly, periodically transitioning the communication circuit on and off in parallel with the multicast slots may conserve the sleepy-end device's finite power source.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A control device comprising:
   a communication circuit configured to transmit and receive messages; and
   a control circuit, configured to:
   transmit, via the communication circuit, an indication that the control device is a power-conservative control device;
   receive, in response to transmitting the indication that the control device is a power-conservative control device, a communication schedule, wherein the communication schedule establishes periodic multicast slots for the control device;
   based on the received communication schedule, periodically transition the communication circuit into a wake state to receive messages during the periodic multicast slots, wherein the messages include control instructions for controlling an electrical load;
   control the electrical load in response to the messages received during the wake state, wherein the electrical load is controlled at the same time as other control devices that are configured to receive at least one multicast message during the periodic multicast slots; and based on the received communication schedule, periodically transition the communication circuit off into a sleep state outside of the periodic multicast slots, wherein the communication circuit is configured to draw less power from a power source of the control device when operating in the sleep state than when operating in the wake state.

2. The control device of claim 1, wherein the communication schedule is received from a parent device.

3. The control device of claim 2, wherein the control circuit is configured to receive, via the communication circuit, a unicast message from the parent device during at least one multicast slot of the periodic multicast slots.

4. The control device of claim 3, wherein the control circuit is further configured to transmit, via the communication circuit, an acknowledgment message in response to the unicast message that is received during the at least one multicast slot.

5. The control device of claim 2, wherein the control circuit is further configured to receive, via the communication circuit, a unicast message from the parent device during a unicast slot configured for receiving unicast messages at a time that does not overlap with the periodic multicast slots.

6. The control device of claim 2, wherein the control circuit is further configured to:
receive, from the parent device, a second communication schedule for communicating with an auxiliary parent device, wherein the second communication schedule establishes second periodic multicast slots, wherein the second periodic multicast slots do not overlap with the periodic multicast slots established by the communication schedule received from the parent device;
based on the second communication schedule, periodically transition the communication circuit on during the wake state to receive messages from the auxiliary parent based on the second periodic multicast slots; and
based on the second communication schedule, periodically transition the communication circuit off during the sleep state based on the periodic multicast slots and the second periodic multicast slots.

7. The control device of claim 6, wherein the control circuit is further configured to:
receive, via the communication circuit, an advertisement message from a device;
determine whether the device is an auxiliary parent of the control device;
measure, based on a determination that the device is not the auxiliary parent of the control device, a communication quality metric of the advertisement message; and
determine whether the communication quality metric of the advertisement message is greater than or equal to a threshold; and
based on a determination that the communication quality metric of the advertisement message is greater than or equal to the threshold, update an auxiliary parent table for the control device, wherein the auxiliary parent table is updated to include the device.

8. A method for establishing a communication schedule for a control device, the method comprising:
transmitting an indication that the control device is a power-conservative control device;
receiving, in response to transmitting the indication that the control device is a power-conservative control device, a communication schedule, wherein the communication schedule establishes periodic multicast slots for the control device;

based on the received communication schedule, periodically transitioning a communication circuit of the control device into a wake state to receive messages during the periodic multicast slots, wherein the messages include control instructions for controlling an electrical load;
controlling the electrical load in response to the messages received during the wake state, wherein the electrical load is controlled at the same time as other control devices that are configured to receive at least one multicast message during the periodic multicast slots; and
based on the received communication schedule, periodically transitioning the communication circuit of the control device off into a sleep state outside of the periodic multicast slots, wherein the communication circuit is configured to draw less power from a power source of the control device when operating in the sleep state than when operating in the wake state.

9. The method of claim 8, wherein the communication schedule is received from a parent device.

10. The method of claim 9, further comprising receiving a unicast message from the parent device during at least one multicast slot of the periodic multicast slots.

11. The method of claim 10, further comprising transmitting an acknowledgment message in response to the unicast message that is received during the at least one multicast slot.

12. The method of claim 9, further comprising receiving a unicast message from the parent device during a unicast slot configured for receiving unicast messages at a time that does not overlap with the periodic multicast slots.

13. The method of claim 9, further comprising:
receiving, from the parent device, a second communication schedule for communicating with an auxiliary parent device, wherein the second communication schedule establishes second periodic multicast slots, wherein the second periodic multicast slots do not overlap with the periodic multicast slots established by the communication schedule received from the parent device;
based on the second communication schedule, periodically transitioning the communication circuit of the control device on during the wake state to receive messages from the auxiliary parent based on the second periodic multicast slots; and
based on the second communication schedule, periodically transitioning the communication circuit of the control device off during the sleep state based on the periodic multicast slots and the second periodic multicast slots.

14. The method claim 13, further comprising:
receiving an advertisement message from a device;
determining whether the device is an auxiliary parent of the control device;
measuring, based on a determination that the device is not the auxiliary parent of the control device, a communication quality metric of the advertisement message; and
determining whether the communication quality metric of the advertisement message is greater than or equal to a threshold; and
based on a determination that the communication quality metric of the advertisement message is greater than or equal to the threshold, updating an auxiliary parent table for the control device, wherein the auxiliary parent table is updated to include the device.

15. A non-transitory computer-readable storage media comprising computer-executable instructions stored thereon that, when executed by a control circuit, cause the control circuit to:
- transmit, via a communication circuit, an indication that a control device is a power-conservative control device;
- receive, in response to transmitting the indication that the control device is a power-conservative control device, a communication schedule, wherein the communication schedule establishes periodic multicast slots for the control device;
- based on the received communication schedule, periodically transition the communication circuit into a wake state to receive messages during the periodic multicast slots, wherein the messages include control instructions for controlling an electrical load;
- control the electrical load in response to the messages received during the wake state, wherein the electrical load is controlled at the same time as other control devices that are configured to receive at least one multicast message during the periodic multicast slots; and
- based on the received communication schedule, periodically transition the communication circuit off into a sleep state outside of the periodic multicast slots, wherein the communication circuit is configured to draw less power from a power source of the control device when operating in the sleep state than when operating in the wake state.

16. The non-transitory computer-readable media of claim 15, wherein the computer-readable media is configured to cause the control circuit to receive the communication schedule from a parent device.

17. The non-transitory computer-readable media of claim 16, wherein the computer-readable media is configured to cause the control circuit to receive, via the communication circuit, a unicast message from the parent device during at least one multicast slot of the periodic multicast slots.

18. The non-transitory computer-readable media of claim 17, wherein the computer-readable media is further configured to cause the control circuit to transmit, via the communication circuit, an acknowledgment message in response to the unicast message that is received during the at least one multicast slot.

19. The non-transitory computer-readable media of claim 16, wherein the computer-readable media is further configured to cause the control circuit to receive, via the communication circuit, a unicast message from the parent device during a unicast slot configured for receiving unicast messages at a time that does not overlap with the periodic multicast slots.

20. The non-transitory computer-readable media of claim 16, wherein the computer-readable media is further configured to cause the control circuit to:
- receive, from the parent device, a second communication schedule for communicating with an auxiliary parent device, wherein the second communication schedule establishes second periodic multicast slots, wherein the second periodic multicast slots do not overlap with the periodic multicast slots established by the communication schedule received from the parent device;
- based on the second communication schedule, periodically transition the communication circuit on during the wake state to receive messages from the auxiliary parent based on the second periodic multicast slots; and
- based on the second communication schedule, periodically transition the communication circuit off during the sleep state based on the periodic multicast slots and the second periodic multicast slots.

21. The non-transitory computer-readable media of claim 20, wherein the computer-readable media is further configured to cause the control circuit to:
- receive, via the communication circuit, an advertisement message from a device;
- determine whether the device is an auxiliary parent of the control device;
- measure, based on a determination that the device is not the auxiliary parent of the control device, a communication quality metric of the advertisement message; and
- determine whether the communication quality metric of the advertisement message is greater than or equal to a threshold; and
- based on a determination that the communication quality metric of the advertisement message is greater than or equal to the threshold, update an auxiliary parent table for the control device, wherein the auxiliary parent table is updated to include the device.

* * * * *